United States Patent [19]
Hori

[11] Patent Number: 6,038,070
[45] Date of Patent: Mar. 14, 2000

[54] TRANSMISSION TYPE SCREEN WITH GLOSSY PERMEABLE LAYER AND METHOD OF MANUFACTURE

[75] Inventor: Hidehiko Hori, Tokyo, Japan

[73] Assignee: Mitsubishi Denki Kabushiki Kaisha, Tokyo, Japan

[21] Appl. No.: 08/898,588

[22] Filed: Jul. 22, 1997

[30] Foreign Application Priority Data

Mar. 3, 1997 [JP] Japan ................................. 9-048129

[51] Int. Cl.⁷ ................................................. G03B 21/60
[52] U.S. Cl. ................................. 359/456; 359/453
[58] Field of Search ............................ 359/443, 449, 359/452, 453, 456, 457, 460

[56] References Cited

U.S. PATENT DOCUMENTS

| | | | |
|---|---|---|---|
| 4,730,897 | 3/1988 | McKechnie et al. | 350/128 |
| 5,066,099 | 11/1991 | Yoshida et al. | 359/457 |
| 5,196,960 | 3/1993 | Matsuzki et al. | 359/453 |
| 5,400,069 | 3/1995 | Braun et al. | 348/20 |
| 5,434,706 | 7/1995 | Mitani et al. | 359/457 |
| 5,581,407 | 12/1996 | Mitani et al. | 359/619 |
| 5,666,155 | 9/1997 | Mersereau | 348/20 |
| 5,668,662 | 9/1997 | Magocs et al. | 359/452 |
| 5,724,182 | 3/1998 | Mitani et al. | 359/457 |
| 5,745,288 | 4/1998 | Miyata et al. | 359/457 |

FOREIGN PATENT DOCUMENTS

| | | |
|---|---|---|
| 1-302204 | 12/1989 | Japan . |
| 4-119444 U | 10/1992 | Japan . |

*Primary Examiner*—Safet Metjahic
*Assistant Examiner*—Christopher E. Mahoney

[57] ABSTRACT

A permeable image display screen having a lenticular lens sheet including a plurality of semi-cylindrical lens portions and a plurality of non-focusing portions. The lens portions are arranged in parallel with spaces on a side of an image light emission surface of the lenticular lens sheet and contain diffusion particles for diffusing image light incident from an image light incidence surface of the lenticular lens sheet. Each of the non-focusing portions, through which the image light does not pass, is arranged on the side of the image light emission surface and between two adjacent lens portions. A glossy permeable layer is provided on the image light emission surface of the lenticular lens sheet.

18 Claims, 19 Drawing Sheets

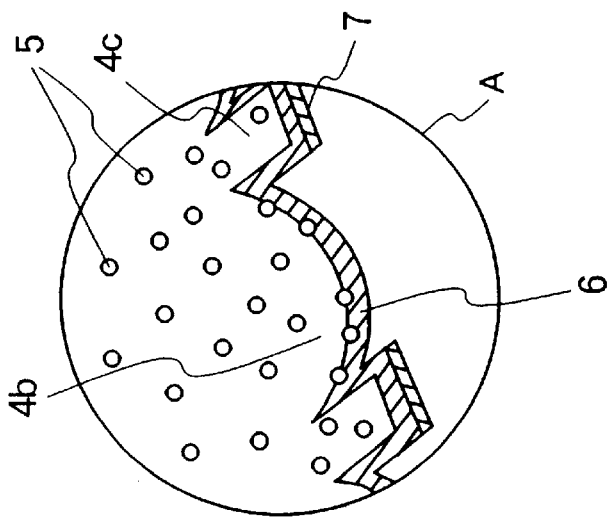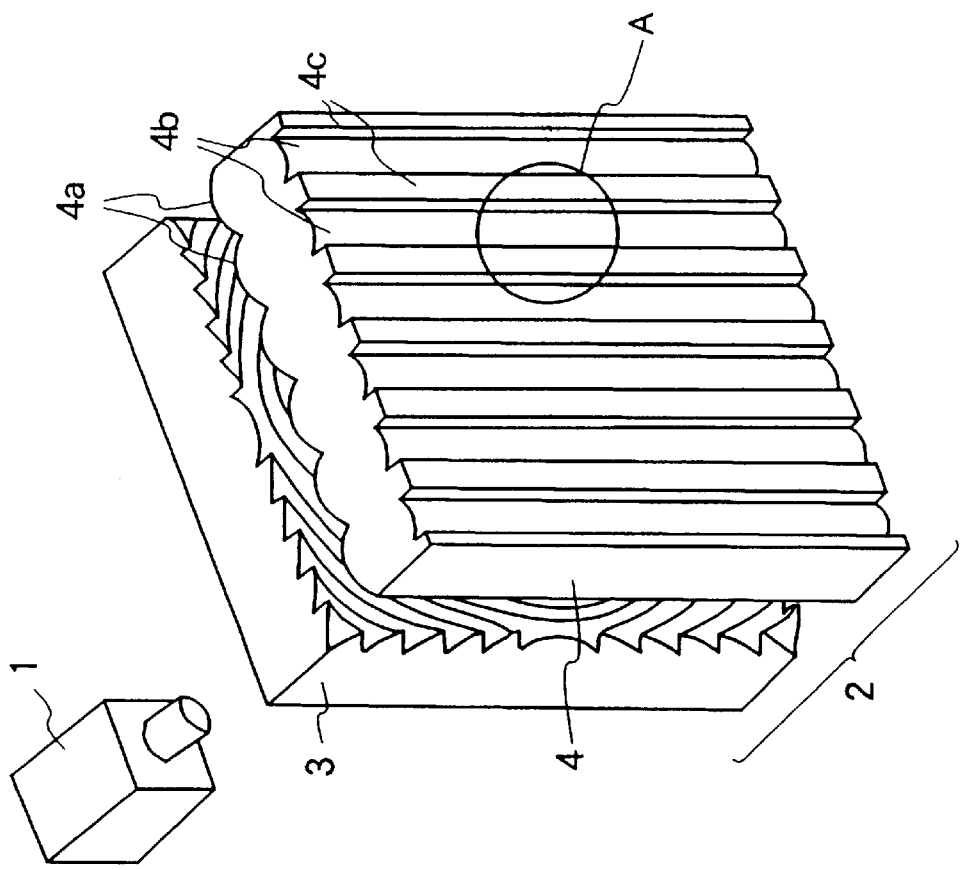

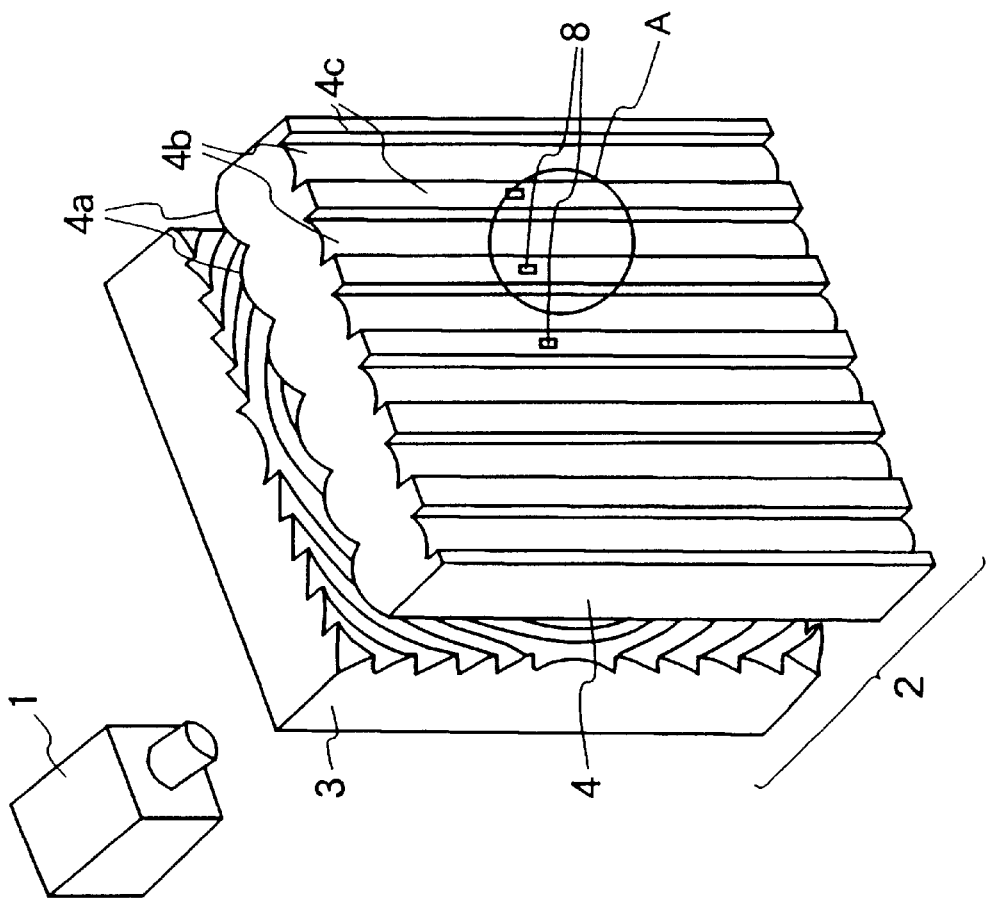
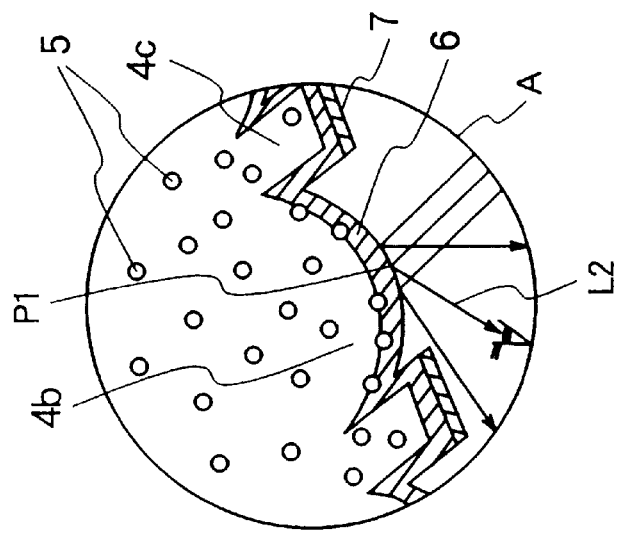
FIG. 4A
FIG. 4B

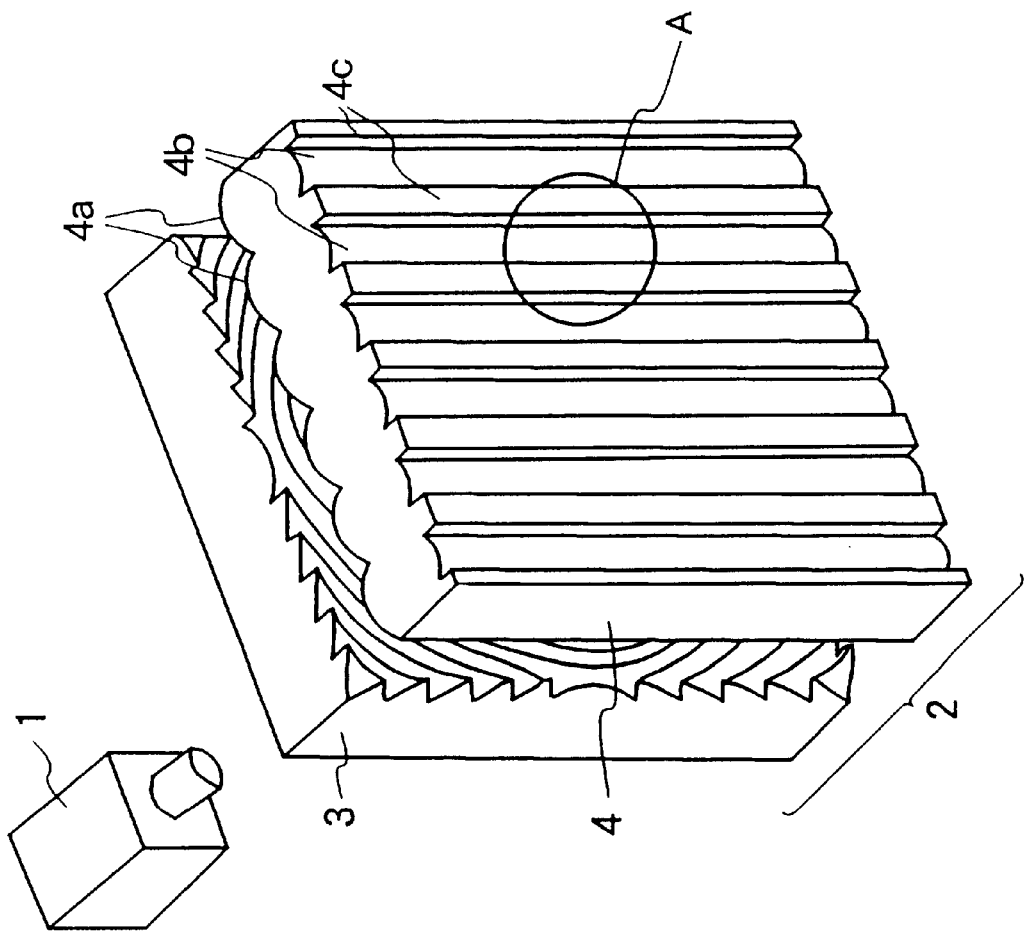
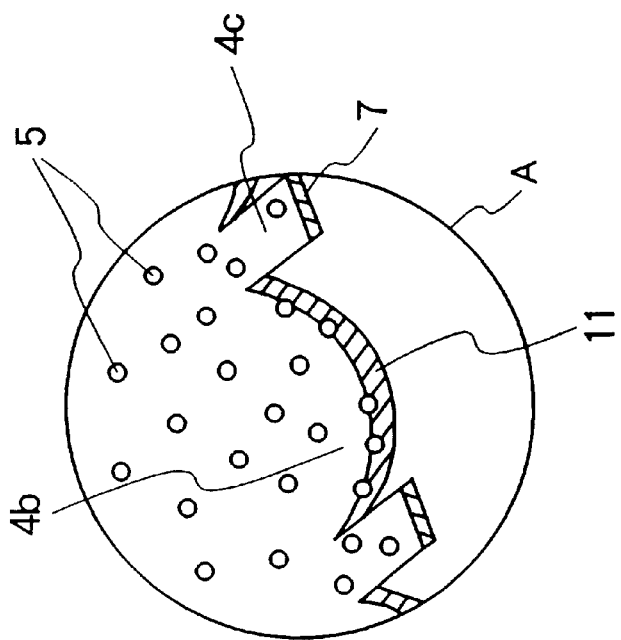

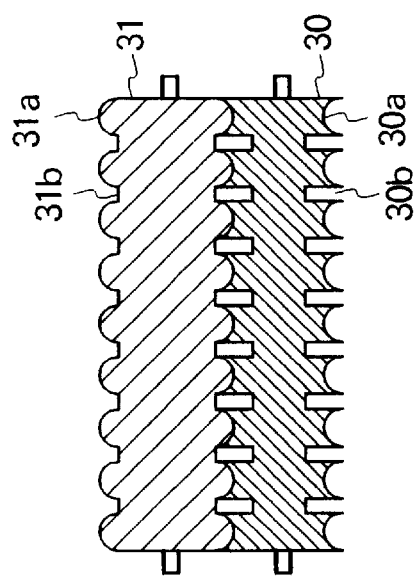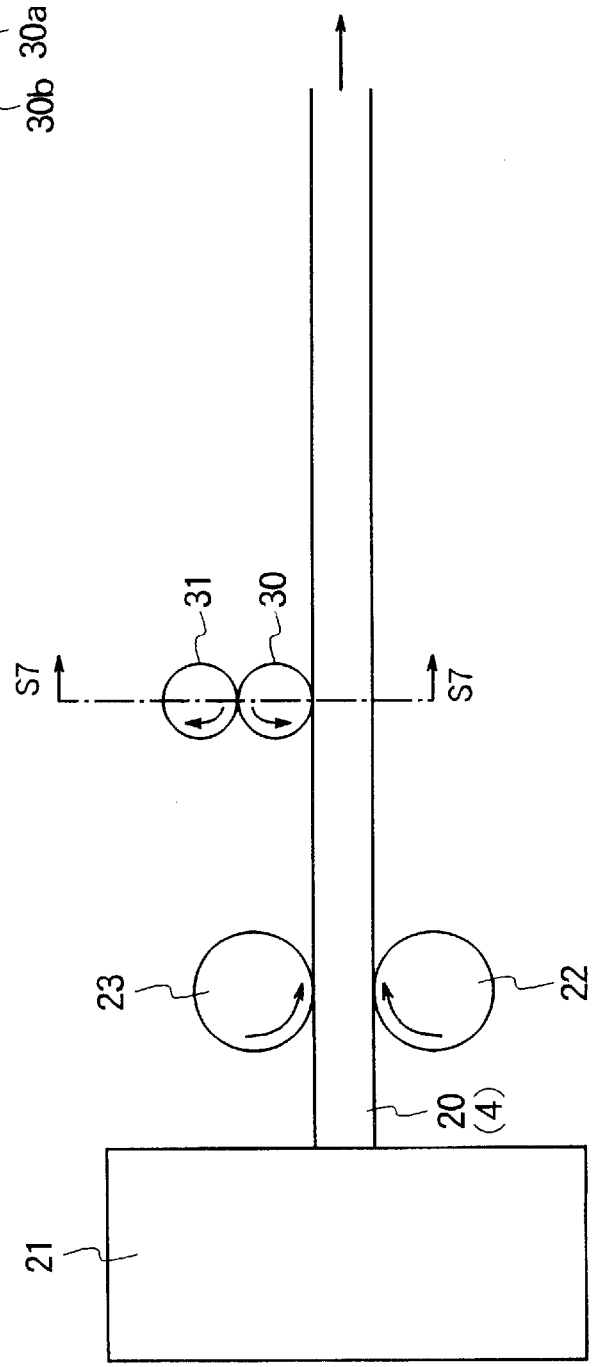

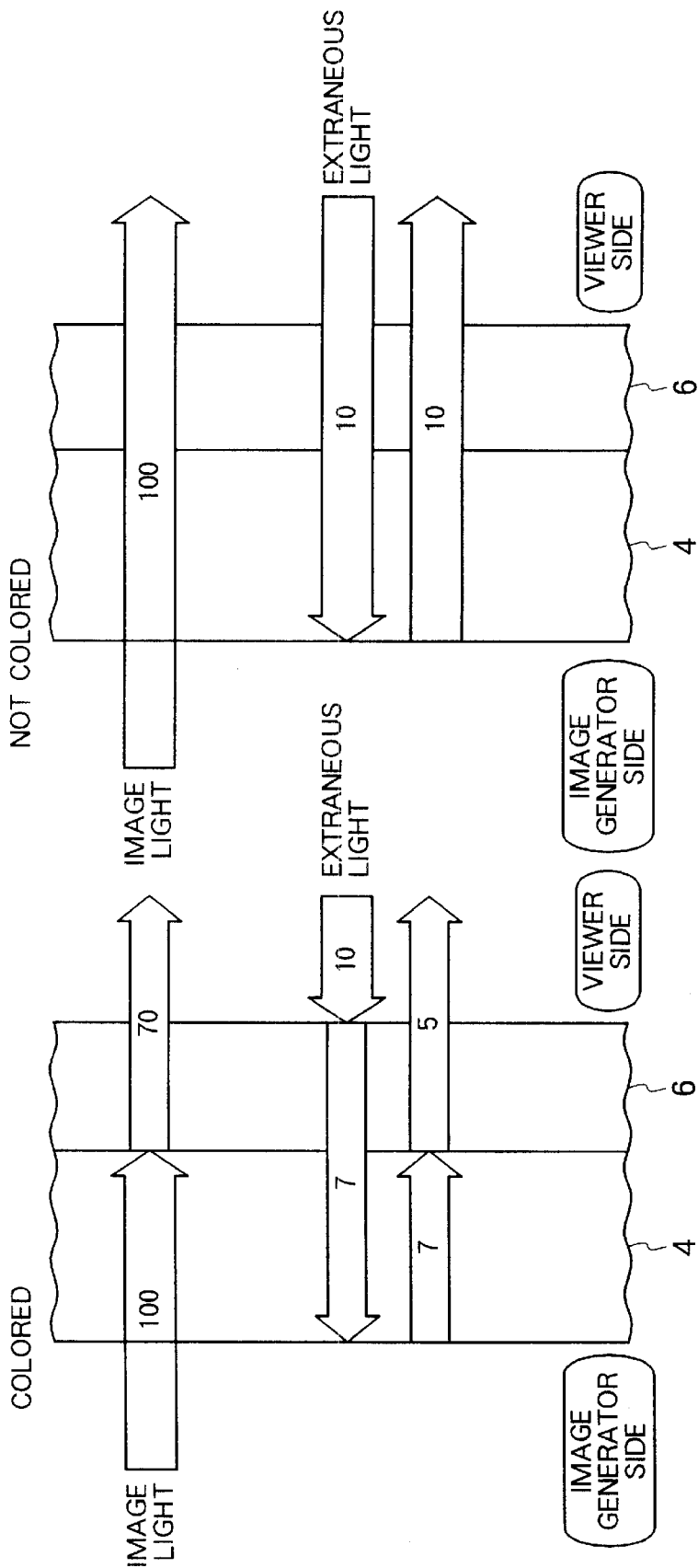

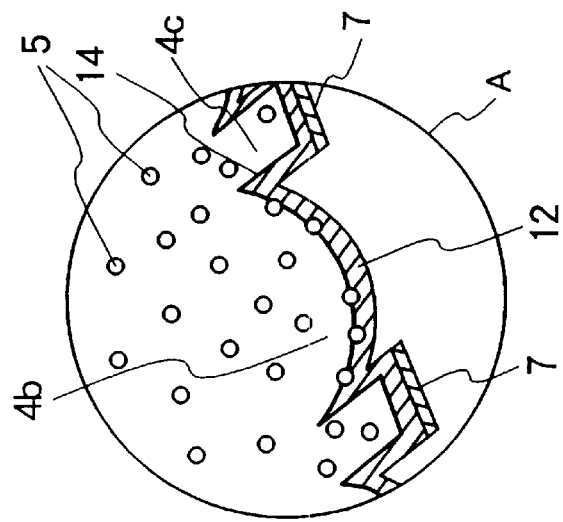
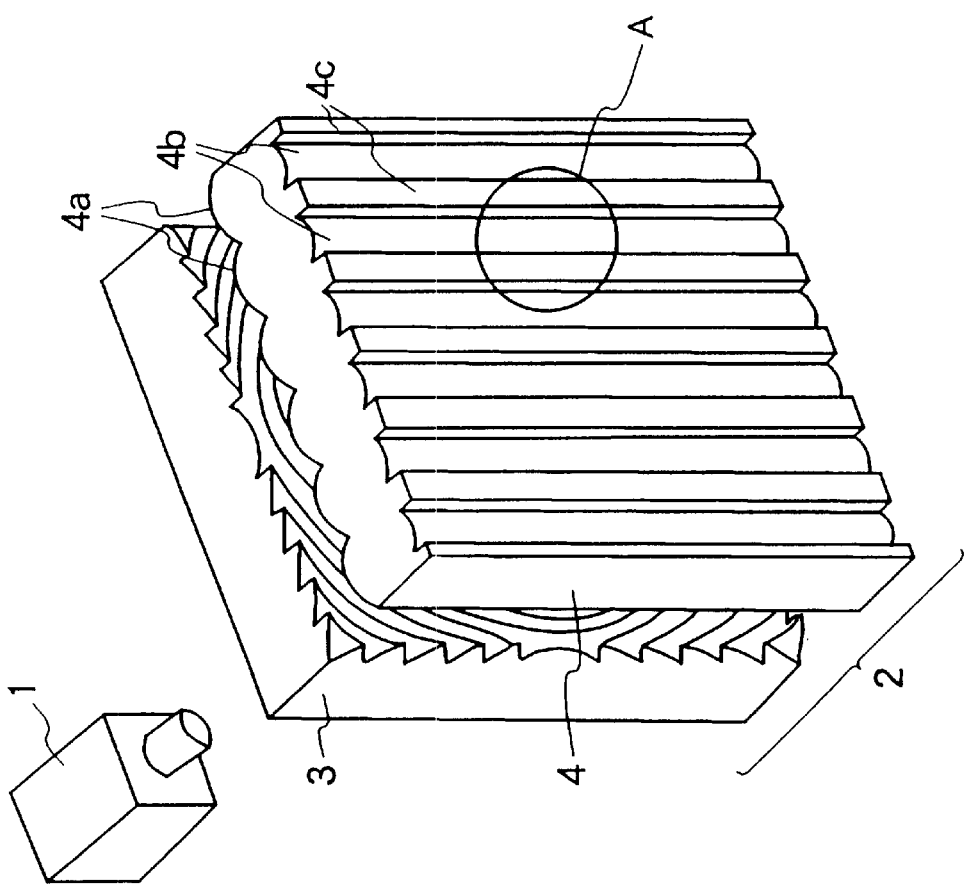

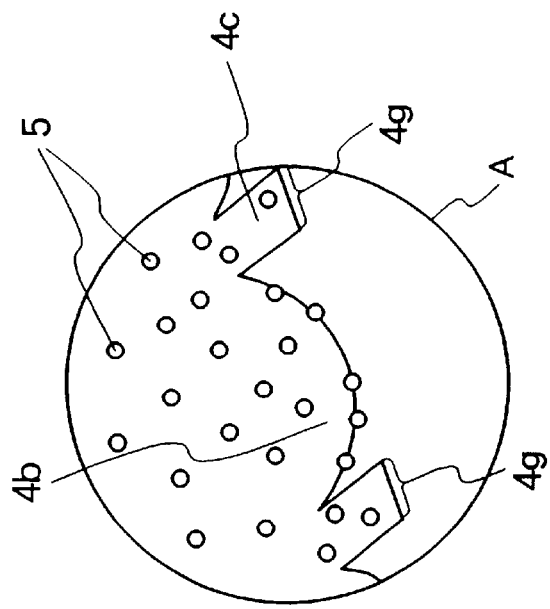
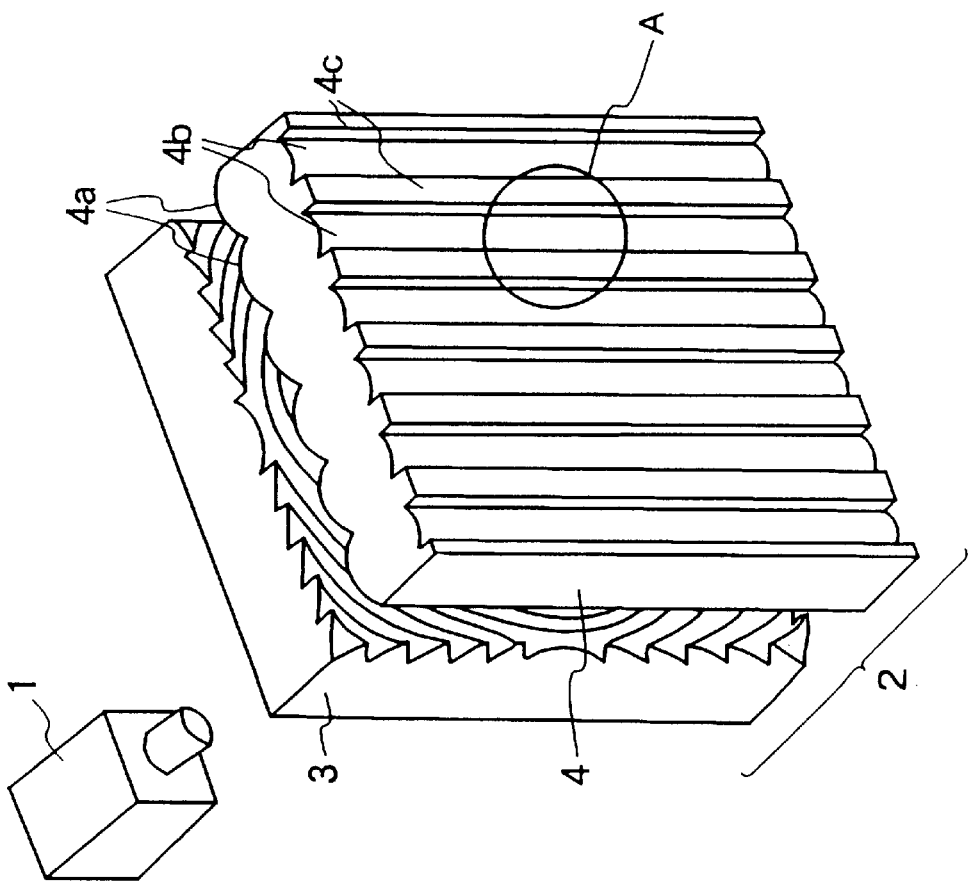
FIG. 17A
FIG. 17B

TRANSMISSION TYPE SCREEN WITH GLOSSY PERMEABLE LAYER AND METHOD OF MANUFACTURE

BACKGROUND OF THE INVENTION

The present invention relates to a permeable image display screen incorporated into a rear projection type display apparatus.

FIGS. 19A and 19B schematically show the basic structure of a conventional rear projection type display apparatus having a permeable image display screen. FIG. 19A is a schematic perspective view of the display apparatus, and FIG. 19B is an enlarged horizontal sectional view of a section A in FIG. 19A.

In the display apparatus shown in FIGS. 19A and 19B, image light from an image generator 1 is diverging and directed toward the permeable image display screen 2. The diverging image light passes through a Fresnel lens sheet 3 and is refracted, and becomes nearly parallel light.

Thereafter, the nearly parallel light is incident on a lenticular lens sheet 4. The image light incident on the lenticular lens sheet 4 is focused by the first lens portions 4a of the lenticular lens sheet 4. The focused light is moderately diffused in horizontal and vertical directions by diffusion particles 5 and second lens portion 4b of the lenticular lens sheet 4 and then reaches the viewer's eyes. The diffusion particles 5 have a function of moderately widening an angle of view by refracting and scattering the image light. In FIGS. 19A and 19B, a reference numeral 4c denotes non-focusing portions through which the image light does not pass.

However, as shown in FIG. 19B, when the diffusion particles 5 are contained in the lenticular lens sheet 4, some diffusion particles 5 protrude from the image light emission surface of the lenticular lens sheet 4 and roughen the image light emission surface. For this reason, when the display apparatus is installed in a well-lighted place, the extraneous light is reflected at the image light emission surface and becomes scattered light, which reaches the viewer's eyes. Consequently, there arises the problem that the viewer recognizes roughness on a displayed image and can not detect the gloss and depth of the image, thereby degrading the image quality. Also, since the scattered light of the extraneous light due to the diffusion particles 5 is produced on the dark portions of the image light emission surface from which the image light does not emerge, there arises the problem that the viewer feels as if the dark portions are slightly clouded and the contrast is therefore reduced.

To overcome such problems, there is considered, for example, a countermeasure of installing a light permeable flat plate 9, as shown in FIG. 20, on the viewer's side of the lenticular lens sheet 4. However, there arises another problem that the reflected light of the extraneous light, reflected regularly at the surface of the light permeable flat plate 9, overlaps the image light, thereby considerably degrading the image quality.

SUMMARY OF THE INVENTION

Accordingly, it is an object of the present invention to provide a permeable image display screen which is capable of displaying an image so that the gloss and depth of the image can be observed by the viewer without roughness and there is less image quality degradation due to extraneous light.

A permeable image display screen according to the present invention has a lenticular lens sheet including a plurality of semi-cylindrical lens portions and a plurality of non-focusing portions. The lens portions are arranged with spaces on a side of an image light emission surface of the lenticular lens sheet and contain diffusion particles for diffusing image light incident from an image light incidence surface of the lenticular lens sheet. Each of the non-focusing portions, through which the image light does not pass, Is arranged on the side of the image light emission surface and between two adjacent lens portions. A glossy permeable layer is provided on the image light emission surface of the lenticular lens sheet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A is a schematic perspective view showing a rear projection type display apparatus incorporating a permeable image display screen of a first embodiment of the present invention;

FIG. 1B is an enlarged horizontal sectional view of a section A in FIG. 1A;

FIGS. 4A and 4B are diagrams for explaining how only the reflected light from point P1 is incident on viewer's eyes;

FIG. 6A is a schematic perspective view showing a rear projection type display apparatus having a permeable image display screen of a second embodiment of the present invention;

FIG. 6B is an enlarged horizontal sectional view of a section A in FIG. 6A;

FIG. 7A is an explanatory diagram showing an example of a method of fabricating the lenticular lens sheet of FIG. 6A;

FIG. 7B is a sectional view taken substantially along line S7–S7 of FIG. 7A;

FIG. 8A is a diagram for explaining the influence of extraneous light when the glossy permeable coating 6 has been colored (e.g., case of a third embodiment);

FIG. 8B is a diagram for explaining the influence of extraneous light when the glossy permeable coating has not been colored;

FIG. 11A is a schematic perspective view showing a rear projection type display apparatus having a permeable image display screen of a seventh embodiment of the present invention;

FIG. 11B is an enlarged horizontal sectional view of a section A in FIG. 11A;

FIG. 17A is a schematic perspective view showing a rear projection type display apparatus having a permeable image display screen of a fifteenth embodiment of the present invention;

FIG. 17B is an enlarged horizontal sectional view of a section A in FIG. 17A;

DETAILED DESCRIPTION OF THE INVENTION

First Embodiment

Figure 2:
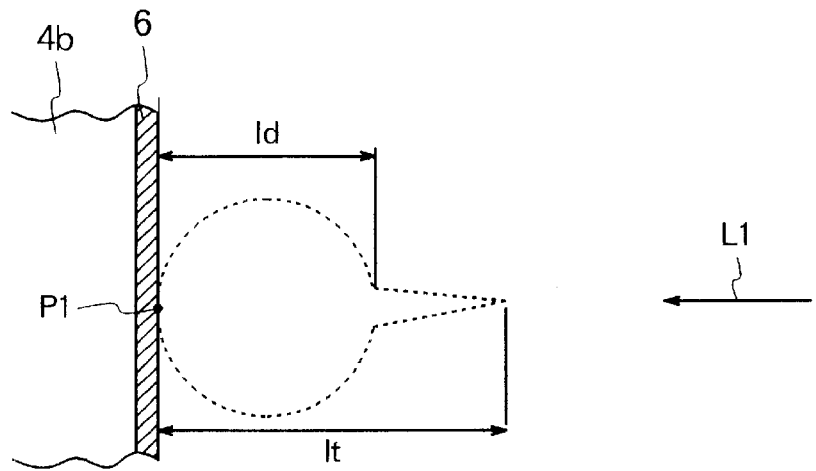
FIG. 2 is a diagram for explaining the gloss of the glossy permeable coating coated on the lenticular lens sheet of FIG. 1A.

FIGS. 1A and 1B schematically show the basic structure of a rear projection type display apparatus having a permeable image display screen of a first embodiment of the present invention. FIG. 1A is a schematic perspective view of the display apparatus, and FIG. 1B is an enlarged horizontal sectional view of a section A in FIG. 1A.

Referring to FIG. 1A, the display apparatus of the first embodiment has an image generator 1 such as a video projector for producing image light, and a permeable image display screen 2 which allows the image light emitted from the image generator 1 to pass therethrough so as to focus into the image.

The permeable image display screen 2 is constituted by a Fresnel lens sheet 3 disposed on a side of the image generator 1 and a lenticular lens sheet 4 disposed in near parallel with the Fresnel lens sheet 3.

The lenticular lens sheet 4 has a plurality of first semi-cylindrical lens portions 4a arranged in parallel on a side of an image light incidence surface facing the Fresnel lens sheet 3, a plurality of second semi-cylindrical lens portions 4b arranged in parallel on a side of an image light emission surface with spaces, and a plurality of protruding non-focusing portions 4c each interposed between adjacent second lens portions 4b. The non-focusing portions 4c do not allow the image light to pass therethrough. The lenticular lens sheet 4 causes the first lens portions 4a and the second lens portions 4b to correspond to each other. Also, the lenticular lens sheet 4 is formed so that the focal point of the each first lens portion 4a is positioned nearly on a surface of the corresponding second lens portion 4b.

In the lenticular lens sheet 4, as shown in FIG. 1B, diffusion particles 5 are dispersedly contained to scatter the image light. The diffusion particles 5 are made of a substance which has a refractive index different from that of a substance constituting a main body of the lenticular lens sheet 4. For example, the diffusion particles 5 are composed of glass powder or acrylic resin.

Referring to FIG. 1B, the lenticular lens sheet 4 is coated on an entire region of the image light emission surface, that is, the entire region of the surfaces of the second lens portions 4a and the non-focusing portions 4c with glossy permeable coating 6. The glossy permeable coating 6 is colorless and transparent, and has a characteristic of close adhesion to a material constituting the lenticular lens sheet 4. Furthermore, the glossy permeable coating 6 is composed of a component which by no means changes the quality of the material of the lenticular lens sheet 4. The preferable kind of the glossy permeable coating 6 depends upon the material of the lenticular lens sheet 4. For example, in the case of lenticular lens sheet 4 made of acrylic resin, acrylic resin coating, urethane resin coating, or acrylic-urethane resin coating can be employed. However, the material of the lenticular lens sheet 4 and the kind of the glossy permeable coating 6 are not limited to these examples.

Furthermore, the glossy permeable coating 6 is applied so that it completely covers the diffusion particles 5 protruding from the image light emission surface of the lenticular lens sheet 4, the roughness degree of the glossy permeable coating 6 becomes low and the glossy permeable coating 6 has gloss. Since a diameter of the each diffusion particle 5 is usually about 10 [μm] to 20 [μm], it is desirable that the glossy permeable coating 6 be made thicker (e.g., about 20 [μm] to 30 [μm]) than the diameter of the diffusion particles 5. However, the diameter of the each diffusion particle 5 and the thickness of the glossy permeable coating 6 are not limited to the range shown in the aforementioned example.

Further, a plurality of light absorbing strips 7 are formed on the glossy permeable coating 6 so that only the non-focusing portions 4c are covered. The light absorbing strips 7 are composed, for example, of printing ink combined with carbon black, absorbs part of the extraneous light, and prevents image quality degradation due to the reflected light of the extraneous light.

In the display apparatus shown in FIGS. 1A and 1B, the image light from the image generator 1 is directed toward the permeable image display screen 2, while it is being expanded and projected, that is, diverging. This diverging image light passes through a Fresnel lens sheet 3 and is refracted and becomes nearly parallel light. Thereafter, the nearly parallel light is incident on the lenticular lens sheet 4. The image light incident on the lenticular lens sheet 4 is focused by the first lens portions 4a of the lenticular lens sheet 4. The focused light is diffused moderately in horizontal and vertical directions by the diffusion particles 5 and the second lens portions 4b of the lenticular lens sheet 4 and then reaches viewer's eyes through the glossy permeable coating 6.

FIG. 2 is an explanatory diagram for explaining the gloss of the glossy permeable coating 6 applied on the lenticular lens sheet 4. In FIG. 2, L1 represents the extraneous light incident on the glossy permeable coating 6 on the side of the image light emission surface of the lenticular lens sheet 4, and a broken line represents a distribution of the reflected light from a point P1 at which the extraneous light L1 was irradiated. The reflected light of the extraneous light L1 incident on the glossy permeable coating 6 consists of regularly reflected light which travels in a direction perpendicular to the surface of the glossy permeable coating 6 due to regular reflection according to the Law of Reflection and diffusely or irregularly reflected light which travels in each direction due to irregular reflection. In the first embodiment, it is desirable that a rough relation of $$I_t \geq 1.2 \times I_d$$

be satisfied, where $I_t$ denotes luminous intensity of a total reflected light obtained by summing up luminous intensity of the regularly reflected light traveling in a fixed direction (i.e., a direction perpendicular to a surface of the coating 6) and luminous intensity of the diffusely reflected light traveling in the same direction, and $I_d$ denotes luminous intensity of the diffusely reflected light traveling in the same direction.

The reason why the aforementioned relation is required is that the normally reflected light can be identified reliably among the diffused light by the viewer if the luminous intensity $I_t$ of the total reflected light is made about 20% greater than the luminous intensity $I_d$ of the diffusely reflected light. On the other hand, if the luminous intensity $I_t$ of the total reflected light is made about 10% greater than the luminous intensity $I_d$ of the diffusely reflected light, some viewers can identify the normally reflected light among the diffusely reflected light, while others can not. The aforementioned relation that the luminous intensity $I_t$ of the total reflected light is made about 20% greater than the luminous intensity $I_d$ of the diffusely reflected light has been obtained by experience. Accordingly, for example, it may be possible that the luminous intensity $I_t$ of the total reflected light is made 19.9% greater than the luminous intensity $I_d$ of the diffusely reflected light.

Figure 3A:
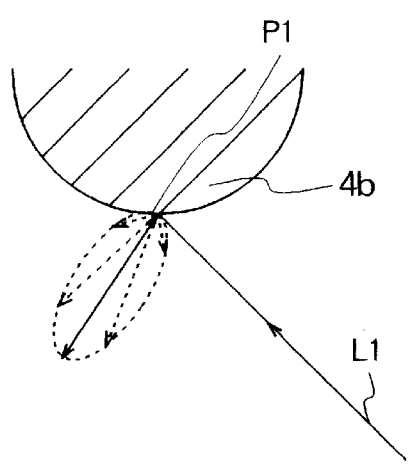
FIG. 3A is an explanatory diagram showing how the extraneous light is reflected at the image light emission surface in a conventional lenticular lens sheet without the glossy permeable coating.
Figure 3B:
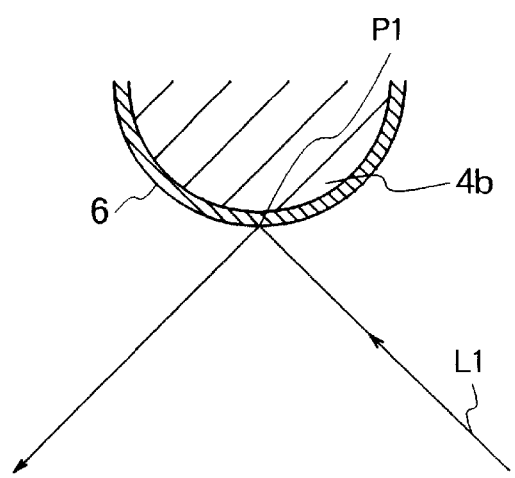
FIG. 3B is an explanatory diagram showing how the extraneous light is reflected at the surface of the glossy permeable coating in the first embodiment.

FIG. 3A is an explanatory diagram showing how the extraneous light L1 is reflected at the image light emission surface of the conventional lenticular lens sheet without the glossy permeable coating 6. FIG. 3B is an explanatory diagram showing how the extraneous light L1 is reflected at the surface of the glossy permeable coating 6 of the first embodiment.

Referring to FIG. 3A, in the case where the lenticular lens sheet 4 is not equipped with the glossy permeable coating 6, the reflected light of the extraneous light L1 incident on the second lens portion 4b scatters and has a distribution of a spread such as that shown by a broken line. For this reason, not only the regularly reflected light from the point P1 of FIG. 3A but also the diffusely reflected light of the extraneous light incident on the vicinity of the point P1 are incident on the viewer's eyes. Consequently, the viewer recognizes the reflected light as roughness on a displayed image and feels as if the image looks slightly whitish.

On the other hand, as shown in FIG. 3B, in the case where the lenticular lens sheet 4 is equipped with the glossy permeable coating 6, much of the reflected light of the extraneous light L1 incident on the glossy permeable coating 6 on the second lens portion 4b becomes normally reflected light. For this reason, the reflected light from the point P1 of FIG. 3B, overlapped on the image light (not shown in FIG. 3B), is incident on the viewer's eyes, but the diffusely reflected light of the extraneous light incident on the vicinity of the point P1 is hardly incident on the viewer's eyes.

Furthermore, the glossy permeable coating 6 has a convexly curved surface which is similar to the cylindrical surface of the second lens portion 4b. FIGS. 4A and 4B are diagrams for explaining how only the reflected light L2 from the point P1 is incident on the viewer's eyes, and show the case where a source of the extraneous light is a horizontally long bar-shaped fluorescent lamp. In the case of FIG. 3B and FIGS. 4A and 4B, the reflected light which reaches the viewer's eyes is mainly the normally reflected light, and as shown by reference numeral 8 in FIG. 4A, the width of reflected light which is incident on the viewer's eyes is very narrow. The reason for this, as shown in FIG. 4B, is that since the extraneous light is reflected at the surface of the glossy permeable coating 6, i.e., at a curved surface, the traveling direction of the reflected light varies depending upon the position at which light is reflected and therefore reflected light L2 which is incident on the viewer's eyes is limited to the light reflected from a narrow portion on the curved surface. On the other hand, in the case of FIGS. 5A and 5B where the extraneous light is reflected at a flat surface, the traveling directions of reflected light are parallel regardless of the position at which the light is reflected, and consequently, the reflected light L3 that is incident on the viewer's eyes is reflected by a wide portion on the flat surface. For this reason, in the case of the permeable image display screen shown in FIGS. 4A and 4B, a viewer recognizes the reflected light L2 not as the reflected light of the extraneous light but rather as the gloss of an image displayed on the point P1, and perceives the depth of the image.

Figure 5B:
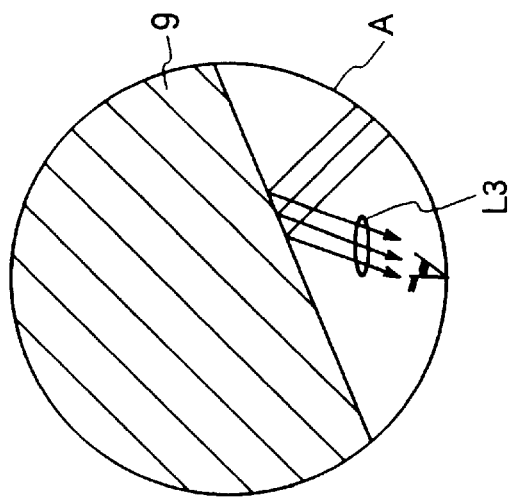
FIGS. 5A and 5B are diagrams for explaining how the regularly reflected light with a certain width is incident on viewer's eye, when a conventional display apparatus is equipped with a light permeable flat plate.
Figure 5A:
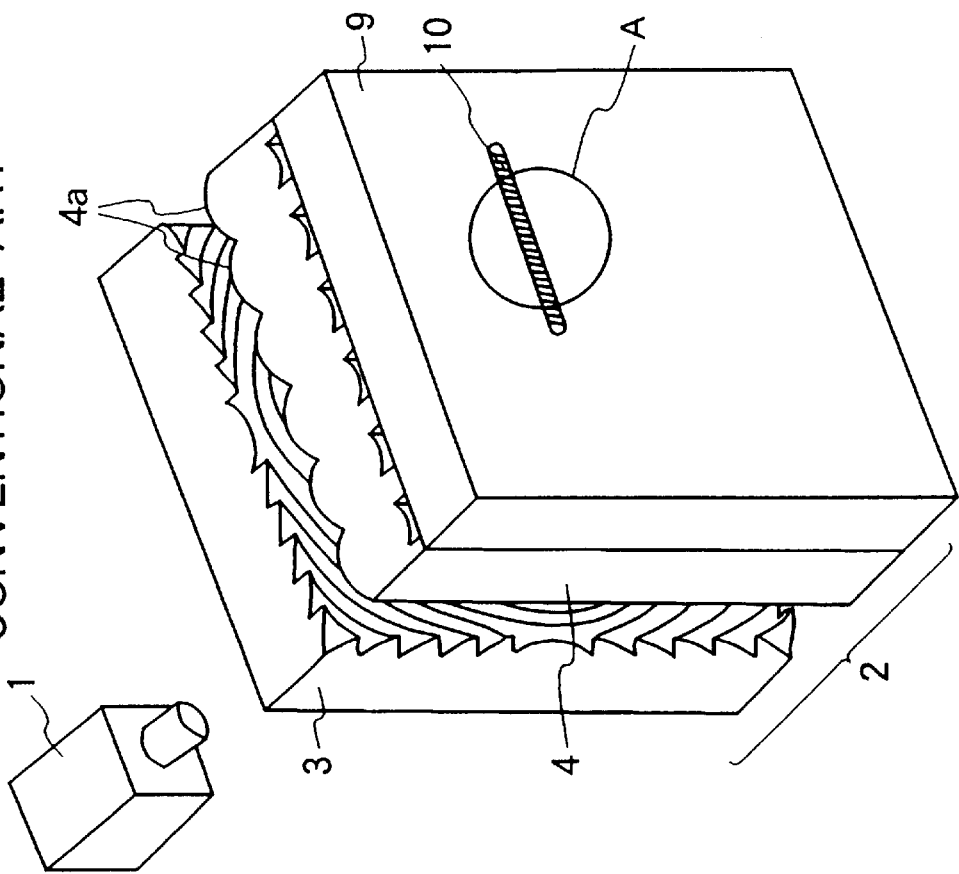

In the case of the conventional display apparatus equipped with the permeable plate 9, the regularly reflected light L3 is incident on the viewer's eyes, as shown at a hatched portion 10 in FIG. 5A (which shows the case where a source of the extraneous light is a horizontally long bar-shaped fluorescent lamp) and as shown by three arrows in FIG. 5B. Therefore, the viewer recognizes the reflected light as the embedded reflection of the extraneous light, and the reflected light overlaps the image light, and consequently, image quality is considerably degraded.

As described above, according to the permeable image display screen of the first embodiment, much of the reflected light, which overlaps the image light and then is incident on the viewer's eyes, can be the normally reflected light whose width is very narrow. For this reason, according to the permeable image display screen of the first embodiment, there is no possibility that the viewer will feel image quality degradation, such as the rough feeling of an image caused when scatteringly reflected light overlaps image and then is incident on the viewer's eyes, and the embedded reflection of the extraneous light caused when the normally reflected light with a wide width overlaps image light and then is incident on the viewer's eyes. According to the permeable image display screen of the first embodiment, the viewer perceives an image of high quality having both gloss and depth, by positively overlapping very narrow, normally reflected light on the image light.

Second Embodiment

FIGS. 6A and 6B schematically show the basic structure of a rear projection type display apparatus having a permeable image display screen of a second embodiment of the present invention. FIG. 6A is a schematic perspective view of the display apparatus, and FIG. 6B is an enlarged horizontal sectional view of a section A in FIG. 6A. Those structures in FIGS. 6A and 6B that are identical or corresponding to the structures in FIGS. 1A and 1B are assigned to the identical symbols.

The permeable image display screen in the second embodiment differs from that of the aforementioned first embodiment in that glossy permeable coating 11 is applied only on the surfaces of the second lens portions 4b on a side of the image light emission surface of the lenticular lens sheet 4 and is not coated on the surfaces of the non-focusing portions 4c.

FIG. 7A is an explanatory diagram showing an example of a method of fabricating the lenticular lens sheet of FIG. 6, and FIG. 7B is a sectional view taken substantially along a line S7—S7 in FIG. 7A.

In FIGS. 7A and 7B, a reference numeral 21 denotes an extrusion molding machine which extrudes the base 20 of the lenticular lens sheet 4 at a desired thickness. 22 denotes a roll for forming the image light incidence surface of the lenticular lens sheet 4, and 23 denotes a roll for forming the image light emission surface of the lenticular lens sheet 4. A reference numeral 30 denotes a roll for applying glossy permeable coating 6 to the image light emission surface of the base 20 (or the lenticular lens sheet 4), and 31 denotes a roll for applying the glossy permeable coating 6 to the roll 30. The roll 30 has on the outer periphery thereof a concavely curved surface portion 30a which is for applying the coating to the second lens portions (4b in FIGS. 6A and 6B) on the side of the image light emission surface of the lenticular lens sheet 4 and a recess portions 30b which are for not applying the coating to the non-focusing portions (4c in FIGS. 6A and 6B). The roll 31 has on the outer periphery thereof a convexly curved surface portion 31a having the same sectional configuration as the second lens portions (4b in FIGS. 6A and 6B) on the side of the image light emission surface of the lenticular lens sheet 4.

When the coating is applied on the surface of the roll 31 and the roll 31 is rotated, the coating will be supplied to the curved surface portions 30a of the roll 30 and transferred to the surface of the base 20 in contact with the roll 30. The portion of the roll 31 between adjacent the curved surface portions 31a is the flat surface portion 31b which has not been protruded, and since it is not in contact with the recess portion 30b of the roll 30, the coating is not supplied to the recess portion 30b of the roll 30. For this reason, the glossy permeable coating 11 is coated only on the surfaces of the second lens portions 4b, as shown in FIG. 6B.

As another method of applying the glossy permeable coating 11 only to the surfaces of the second lens portions 4b, there is a method of forming a mask on the non-focusing portions 4c, then applying the coating to the entire region of the second lens portion 4b and the mask, then removing the mask.

According to the permeable image display screen of the second embodiment, a similar advantage as in the case of the aforementioned first embodiment can be obtained. Except for the above description, the second embodiment is the same as the first embodiment.

Third Embodiment

A permeable image display screen of a third embodiment of the present invention differs from that of the aforementioned first embodiment only in that the glossy permeable coating 6 is colored to semitransparency by containing a substance having a light absorption characteristic. The glossy permeable coating 6 having the light absorption characteristic substance contained therein is also applicable to the permeable image display screen of the aforementioned second embodiment.

FIGS. 8A and 8B are diagrams for explaining the influence of the extraneous light. FIG. 8A shows the case where the glossy permeable coating 6 has been colored (e.g., case of the third embodiment), and FIG. 8B shows the case where the glossy permeable coating 6 has not been colored (e.g., case of the first embodiment). In FIG. 8, a reference numeral 4 denotes a lenticular lens sheet, and 6 denotes glossy permeable coating. A numerical character within an arrow is a relative value representative of the light intensity. In this embodiment, for simplifying a description, the light transmittance of the lenticular lens sheet is taken to be 100%, and the reflectance of the extraneous light at the image light incidence surface of the lenticular lens sheet 4 (on the side of an image generator 1) is taken to be 100%. Also, coloring is performed by putting either a pigment, dyes, metal, oxide or carbon into the glossy permeable coating 6. The light transmittance of the glossy permeable coating 6 after coloring is usually in a range of 95% to 70% when a case without coloring is taken to be 100%, but the light transmittance is not limited thereto.

Referring to FIG. 8A, in the case where the glossy permeable coating 6 has been colored, it is assumed that the intensity of the image light incident on the image light incidence surface is 100, the intensity of the extraneous light incident on the image light emission surface is 10, the light transmittance of the lenticular lens sheet 4 is 100%, and the light transmittance of the glossy permeable coating 6, colored to semitransparency with a substance having a light absorption characteristic, is 70%. In this case, the intensity of the image light reaching the viewer's eyes is reduced to 70, and the extraneous light reaching the viewer's eyes is about 5 because it passes through the glossy permeable coating 6 twice. Therefore, the contrast ratio, which is a ratio of a light portion and a dark portion, becomes 14:1.

On the other hand, referring to FIG. 8B, in the case where the glossy permeable coating 6 has not been colored, it is assumed that the intensity of the incident image light is 100, the intensity of the extraneous light incident on the image light emission surface is 10, the light transmittance of the lenticular lens sheet 4 is 100%, and the light transmittance of the glossy permeable coating 6 is 100%. In this case, the intensity of the image light reaching the viewer's eyes is 100 without being attenuated by the glossy permeable coating 6, and the extraneous light reaching the viewer's eyes is also 10 without attenuation. The contrast ratio becomes 10:1.

Therefore, for example, in the case, where the glossy permeable coating was colored to semitransparency so that the light transmittance thereof becomes 70%, the contrast ratio is improved. Thus, according to the permeable image display screen of the third embodiment, the extraneous light can be absorbed effectively compared to attenuation of the image light, and consequently, image quality degradation due to the extraneous light can be reduced. Except for the above description, the third embodiment is the same as the first embodiment.

Fourth Embodiment

Figure 9A:
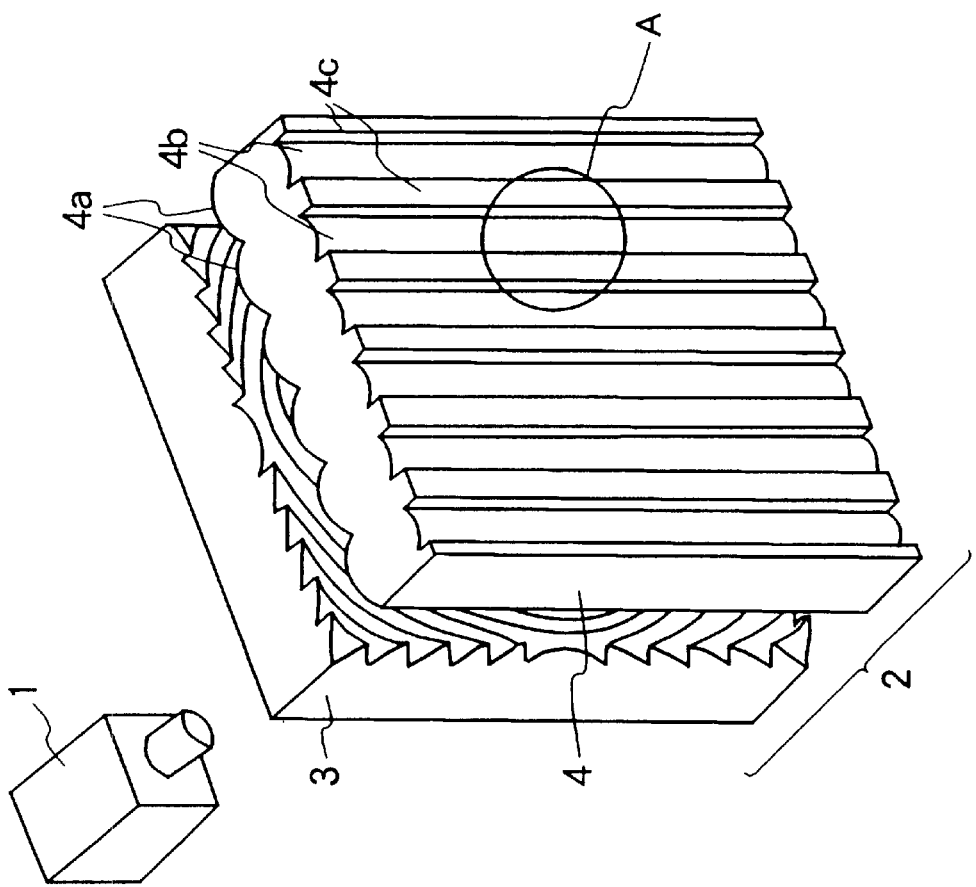
FIG. 9A is a schematic perspective view showing a rear projection type display apparatus having a permeable image display screen of a fourth embodiment of the present invention.
Figure 9B:
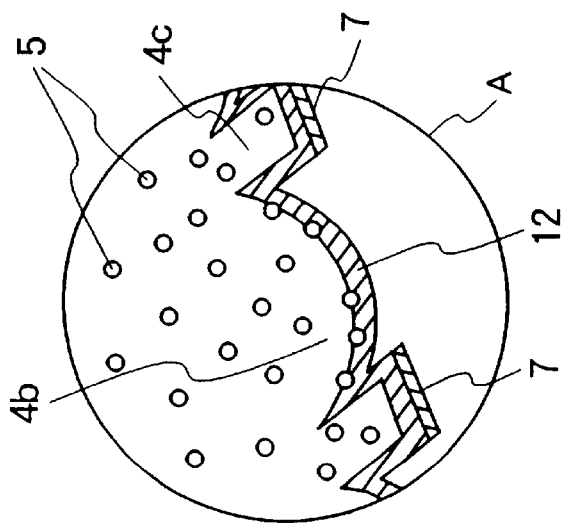
FIG. 9B is an enlarged horizontal sectional view of a section A in FIG. 9A.

FIGS. 9A and 9B schematically show the basic structure of a rear projection type display apparatus having a permeable image display screen of a fourth embodiment of the present invention. FIG. 9A is a schematic perspective view of the display apparatus, and FIG. 9B is an enlarged horizontal sectional view of a section A in FIG. 9A. Those structures in FIGS. 9A and 9B that are identical or corresponding to the structures in FIGS. 1A and 1B are assigned to the identical symbols.

The permeable image display screen in the fourth embodiment differs from that of the aforementioned first embodiment only in that instead of the glossy permeable coating 6, a glossy permeable film 12 is attached to the image light emission surface of the lenticular lens sheet 4. In the case where the lenticular lens sheet 4 is made of acrylic resin, it is preferable that the material of the glossy permeable film 12 is material, such as vinyl chloride film, whose melting temperature is lower than that of acrylic resin. The glossy permeable film 12 in the fourth embodiment has a similar function as the glossy permeable coating 6 in the aforementioned first embodiment. For this reason, by the permeable image display screen in the fourth embodiment, a similar advantage as the case of the aforementioned first embodiment can be obtained. Except for the above description, the fourth embodiment is the same as the first embodiment.

Fifth Embodiment

Figure 10A:
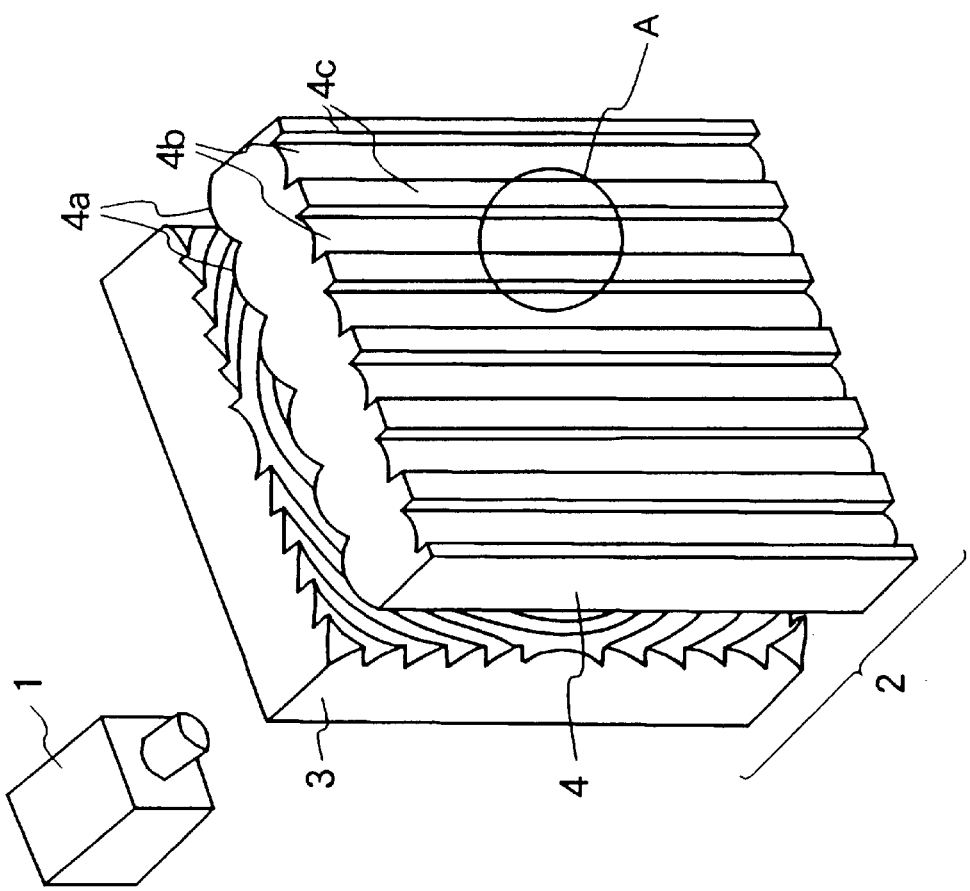
FIG. 10A is a schematic perspective view showing a rear projection type display apparatus having a permeable image display screen of a fifth embodiment of the present invention.
Figure 10B:
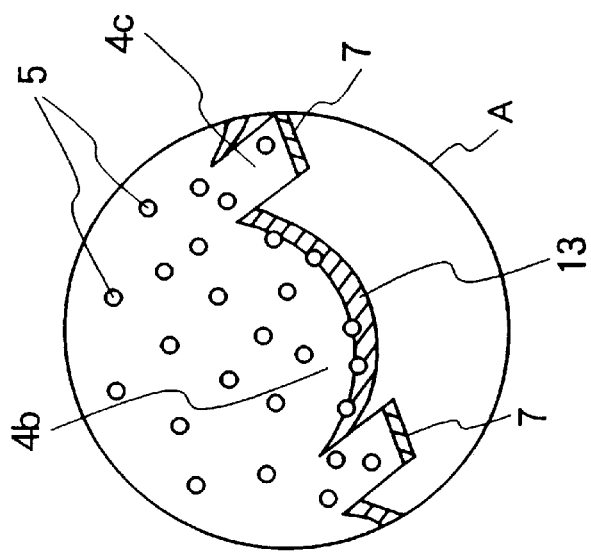
FIG. 10B is an enlarged horizontal sectional view of a section A in FIG. 10A.

FIGS. 10A and 10B schematically show the basic structure of a rear projection type display apparatus having a permeable image display screen of a fifth embodiment of the present invention. FIG. 10A is a schematic perspective view of the display apparatus, and FIG. 10B is an enlarged horizontal sectional view of a section A in FIG. 10A. Those structures in FIGS. 10A and 10B that are identical or corresponding to the structures in FIGS. 1A and 1B are assigned to the identical symbols.

The permeable image display screen in the fifth embodiment differs from the case of the aforementioned fourth embodiment only in that a glossy permeable film 13 is equipped on the surface of the second lens portions 4b on the side of the image light emission surface of the lenticular lens sheet 4 and that a light absorbing strip 7 is equipped on the surface of the non-focusing portion 4c. According to the permeable image display screen in the fifth embodiment, a similar advantage as the case of the aforementioned fourth embodiment can be obtained. Except for the above description, the fifth embodiment is the same as the fourth embodiment.

Sixth Embodiment

The permeable image display screen in the sixth embodiment differs from the case of the aforementioned fourth embodiment only in that a glossy permeable film 12 is colored to semitransparency by containing a substance having a light absorption characteristic. The glossy permeable film 13 containing the aforementioned substance having a light absorbing characteristic is also applicable to the permeable image display screen of the aforementioned fifth embodiment.

According to the permeable image display screen of the sixth embodiment, the extraneous light can be absorbed effectively compared to attenuation of the image light by the principles described in the third embodiment, and consequently, image quality degradation due to the extraneous light can be reduced. Except for the above points, the sixth embodiment is the same as the fourth embodiment.

Seventh Embodiment

FIGS. 11A and 11B schematically show the basic structure of a rear projection type display apparatus having a permeable image display screen of a seventh embodiment of the present invention. FIG. 11A is a schematic perspective view of the display apparatus, and FIG. 11B is an enlarged horizontal sectional view of a section A in FIG. 11A. Those structures in FIGS. 11A and 11B that are identical or corresponding to the structures in FIGS. 9A and 9B are assigned to the identical symbols.

The permeable image display screen in the seventh embodiment differs from the case of the aforementioned fourth embodiment only in that a glossy permeable film 12 is glued to the entire region of the image light emission surface of the lenticular lens sheet 4 by employing a transparent adhesive agent 14. According to the permeable image display screen in the seventh embodiment, a similar advantage as the case of the aforementioned first embodiment can be obtained. Except for the above points, the seventh embodiment is the same as the fourth embodiment. Also, the adhesive agent in the seventh embodiment is applicable to the permeable image display screen of the aforementioned fifth or sixth embodiment.

Eighth Embodiment

The permeable image display screen in the eighth embodiment differs from the case of the aforementioned seventh embodiment only in that an adhesive agent 14 is colored to semitransparency by containing a substance having a light absorption characteristic.

According to the permeable image display screen of the eighth embodiment, the extraneous light can be absorbed effectively compared to attenuation of image light by the principles described in the third embodiment, and consequently, image quality degradation due to the extraneous light can be reduced. Except for the above description, the eighth embodiment is the same as the seventh embodiment.

Ninth Embodiment

Figure 12:
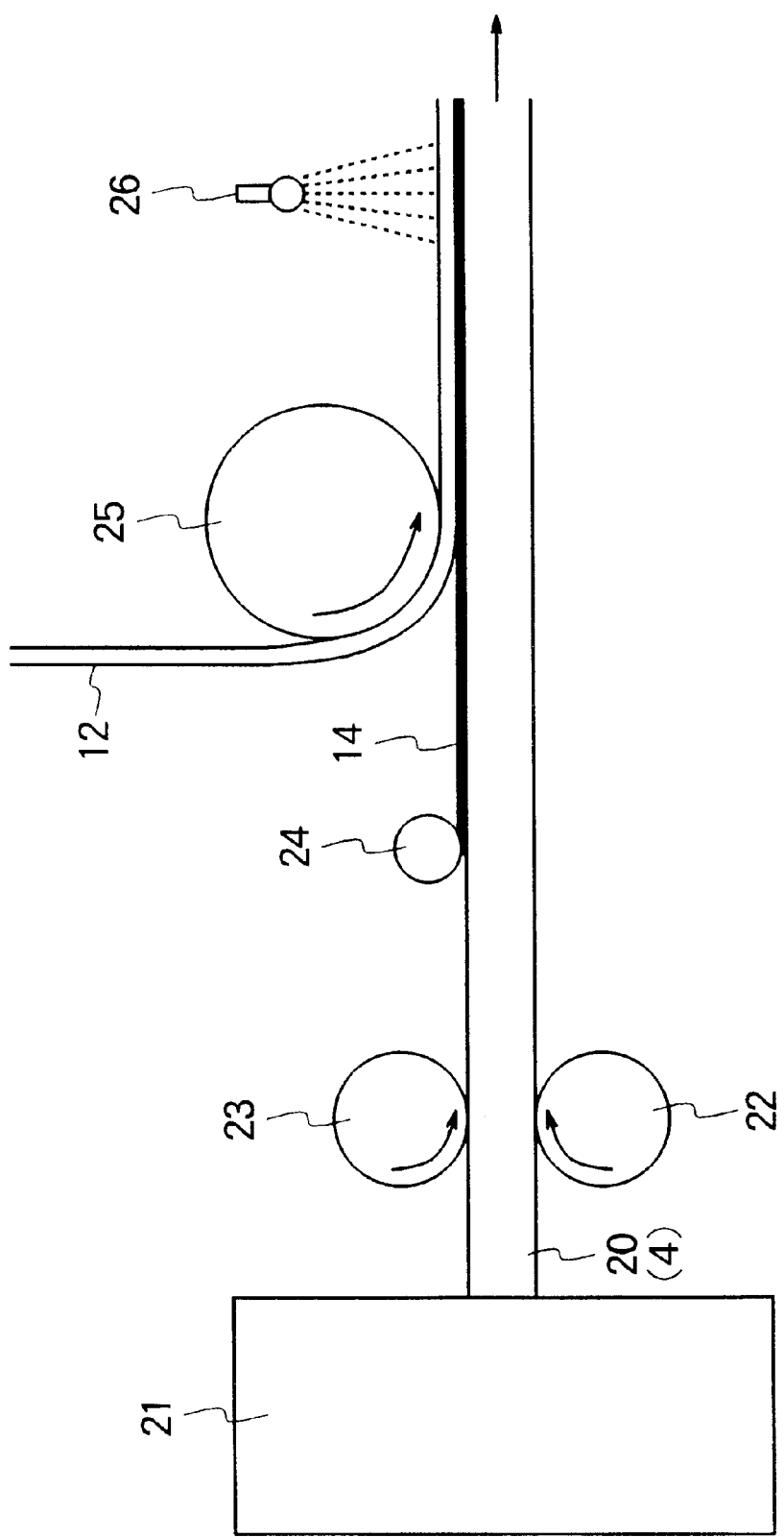
FIG. 12 is an explanatory diagram showing an example of a method of fabricating a lenticular lens sheet, according to a ninth embodiment of the present invention.

FIG. 12 is an explanatory diagram showing an example of a method of fabricating a lenticular lens sheet, according to a ninth embodiment of the present invention. This fabrication method is applicable to the fabrication of the lenticular lens sheet of FIGS. 11A and 11B according to the seventh or eighth embodiment.

In FIG. 12, a reference numeral 21 denotes an extrusion molding machine which extrudes the base 20 of the lenticular lens sheet 4 at a desired thickness. A reference numeral 22 denotes a roll for forming an image light incidence surface of the lenticular lens sheet 4, and 23 denotes a roll for forming an image light emission surface of the lenticular lens sheet 4. A reference numeral 24 denotes a roll for applying a light permeable adhesive agent 14 to the base 20, and 25 denotes a press roll for applying a glossy permeable film 12 against the base 20. Further, a reference numeral 26 denotes an illuminating device. If the adhesive agent 14 is sensitive to ultraviolet rays, the illuminating device 26 is an ultraviolet ray illuminating device. If the adhesive agent 14 is sensitive to visible light, the illuminating device 26 is a visible light illuminating device. If the adhesive agent 14 is sensitive to electromagnetic waves, the illuminating device 26 is an electromagnetic wave illuminating device.

A description will next be made of the gluing process of the glossy permeable film 12 of the case where the adhesive agent 14 is sensitive to ultraviolet rays. Referring to FIG. 12, the base 20 is extruded at a desired thickness from the extrusion molding machine 21 and pressurized by the roll 22 for forming the image light incidence surface and the roll 23 for forming the image light emission surface. As a consequence, the image light incidence surface and the image light emission surface are formed in the base 20. Then, the image light incidence surface and the image light emission surface are cooled to a temperature at which the deformation does not take place. Thereafter, the ultraviolet ray sensitive adhesive agent 14 is applied onto the image light emission surface by the roll 24. Next, the glossy permeable film 12 is pressed against the image light emission surface by the press roll 25 so that the film 12 is closely attached along the image light emission surface. Thereafter, ultraviolet rays are illuminated on the image light emission surface by the illuminating device 26, so that the ultraviolet ray sensitive permeable adhesive agent 14 is hardened. Consequently, the glossy permeable film 12 is glued to the image light emission surface of the base 20.

While the foregoing description has been made of the operation of the case where the permeable adhesive agent 14 is sensitive to ultraviolet rays, the same may also apply to the case where the permeable adhesive agent 14 is sensitive either to visible light or to electromagnetic waves.

Tenth Embodiment

Figure 13:
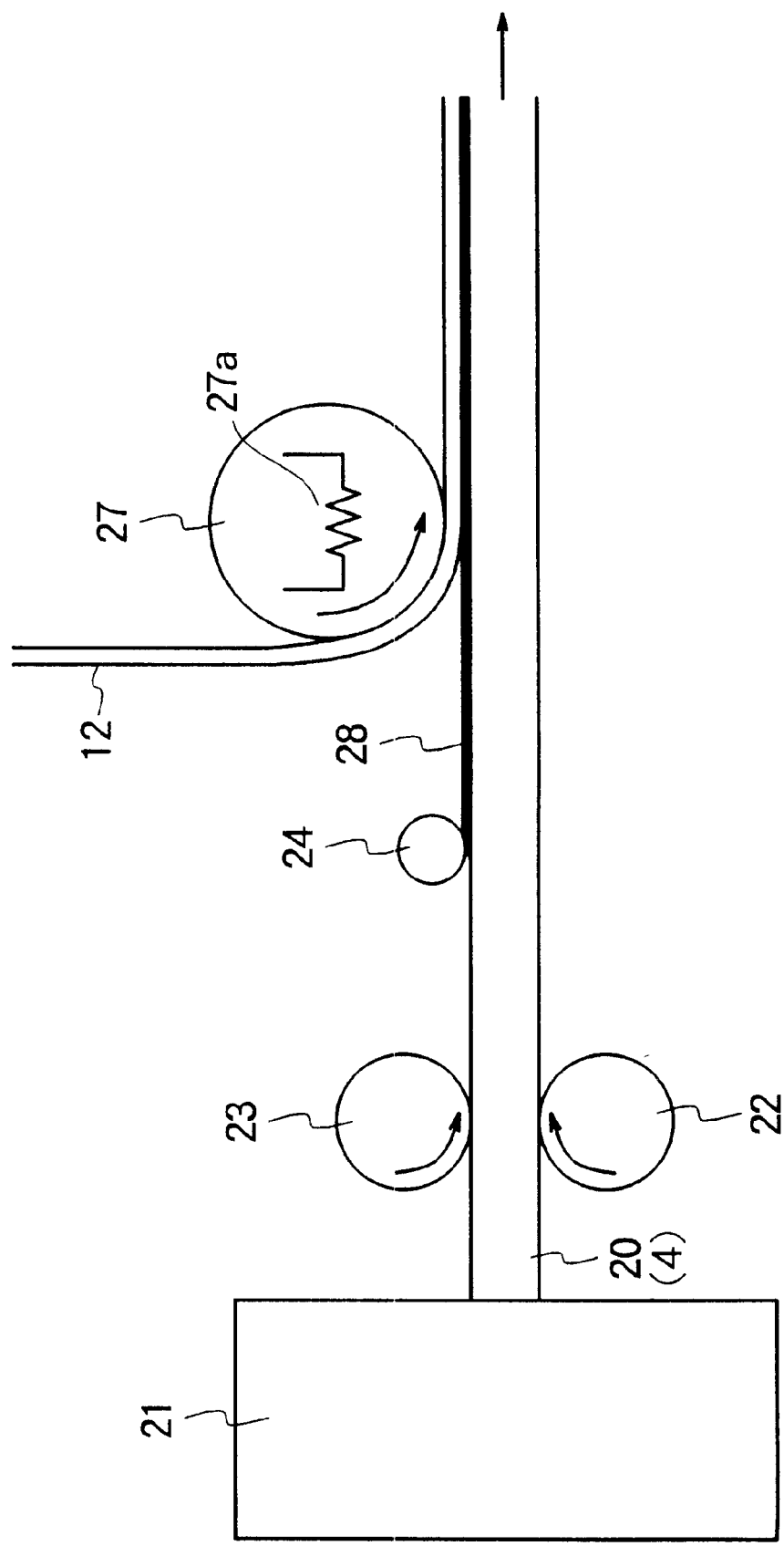
FIG. 13 is an explanatory diagram showing an example of a method of fabricating a lenticular lens sheet, according to a tenth embodiment of the present invention.

FIG. 13 is an explanatory diagram showing an example of a method of fabricating a lenticular lens sheet according to a tenth embodiment of the present invention. This fabrication method is applicable to the fabrication of the lenticular lens sheet of FIGS. 11A and 11B according to the seventh or eighth embodiment.

Those structures in FIG. 13 that are identical or corresponding to the structures in FIG. 12 are assigned to the identical symbols. In FIG. 13, a reference numeral 27 denotes a press roll for applying the glossy permeable film 12 against the base 20. A reference numeral 28 denotes an adhesive agent with thermal plasticity and light permeability. The press roll 27 is incorporated with a heater 27a or the like so that the adhesive agent 28 can be heated.

A description will next be made of the gluing process of the glossy permeable film 12 of the case where the adhesive agent 28 has thermal plasticity. Referring to FIG. 13, the base 20 is extruded at a desired thickness from an extrusion molding machine 21 and pressurized by the rolls 22 and 23. As a consequence, an image light Incidence surface and an image light emission surface are formed. Then, the image light incidence surface and the image light emission surface are cooled to a temperature at which the deformation does not take place. Thereafter, the thermoplastic permeable adhesive agent 28 is applied onto the image light emission surface by an adhesive agent application roll 24. Next, the glossy permeable film 12 is pressed against the image light emission surface by the press roll 25 so that the film 12 is closely attached along the image light emission surface. Thereafter, the glossy permeable film 12 is heated by the roll 27 and is glued to the image light emission surface of the base 20.

Eleventh Embodiment

Figure 14:
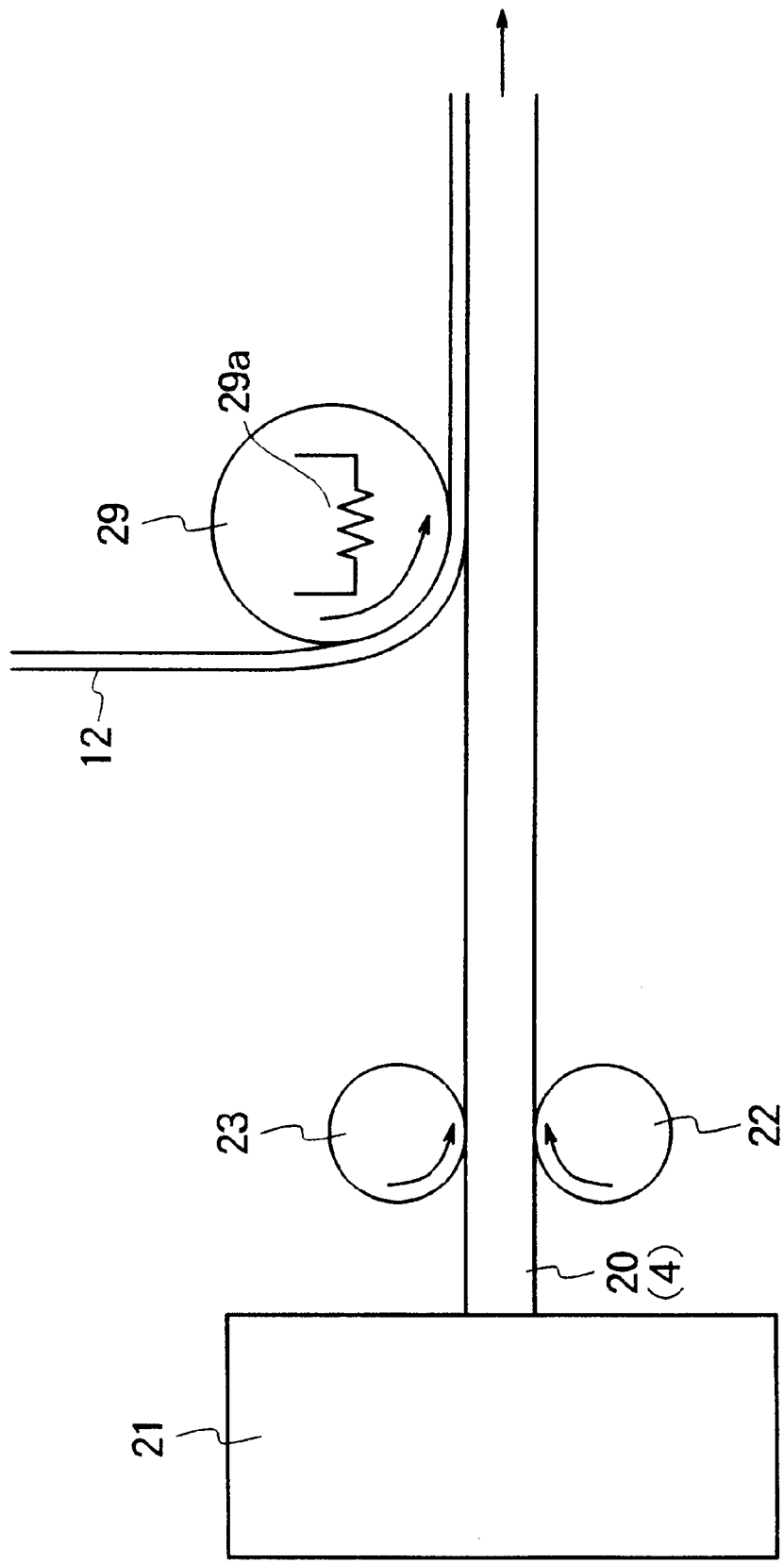
FIG. 14 is an explanatory diagram showing an example of a method of fabricating a lenticular lens sheet, according to an eleventh embodiment of the present invention.

FIG. 14 is an explanatory diagram showing an example of a method of fabricating a lenticular lens sheet according to an eleventh embodiment of the present invention. This fabrication method is applicable to the fabrication of the lenticular lens sheet of FIGS. 9A and 9B or FIGS. 10A and 10B according to the fourth through the sixth embodiments.

Those structures in FIG. 14 that are identical or corresponding to the structures in FIG. 12 are assigned to the identical symbols. In FIG. 14, a glossy permeable film 12 has thermal plasticity, and a press roll 29 is incorporated with a heater 29a or the like so that the gloss permeable film 12 can be heated.

A description will next be made of the gluing process of the glossy permeable film 12 of the case where it has thermal plasticity. Referring to FIG. 14, the base 20 is extruded at a desired thickness from the extrusion molding machine 21 and pressurized by the rolls 22 and 23. As a consequence, the image light incidence surface and the image light emission surface are formed. Then, the image light incidence surface and the image light emission surface are cooled to a temperature at which the deformation does not takes place. Thereafter, the glossy permeable film 12 is pressed against the image light emission surface by the press roll 29 so that the film 12 is closely attached along the image light emission surface. Then, the thermoplastic glossy permeable film 12 is hardened due to temperature drop so that the film 12 Is fixed to the image light emission surface of the base 20.

Twelfth Embodiment

Figure 15A:
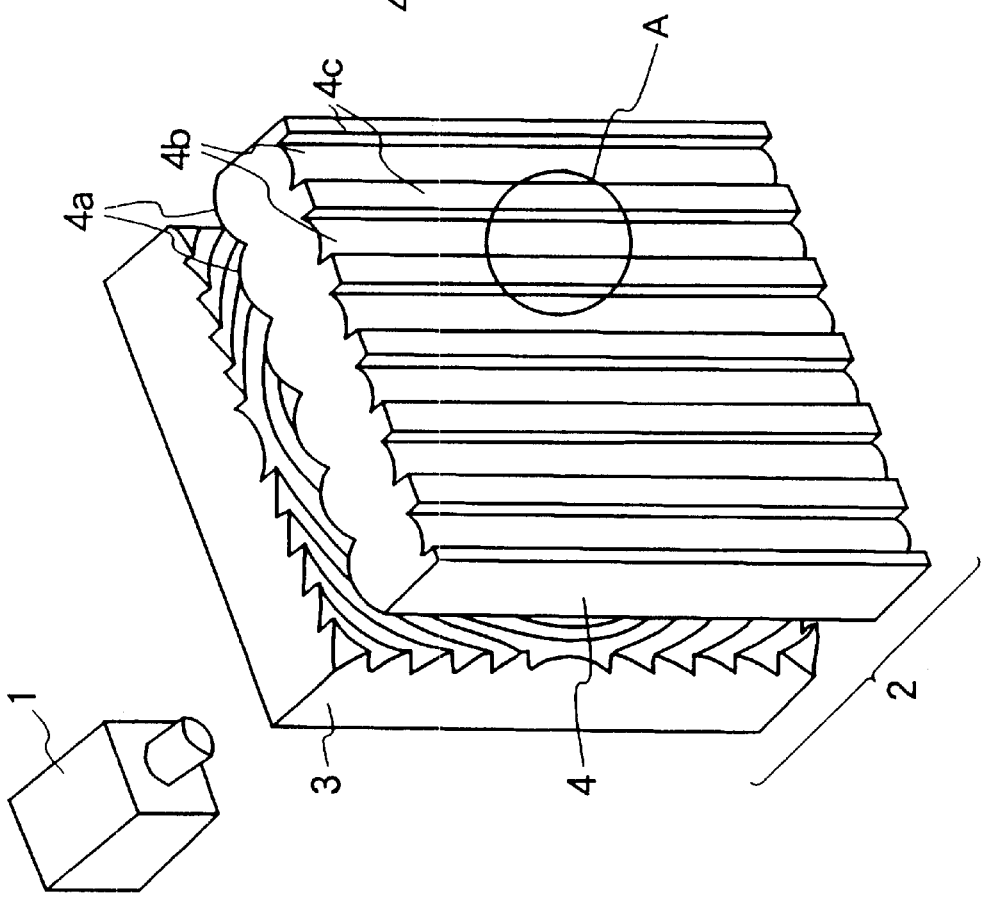
FIG. 15A is a schematic perspective view showing a rear projection type display apparatus having a permeable image display screen of a twelfth embodiment of the present invention.
Figure 15B:
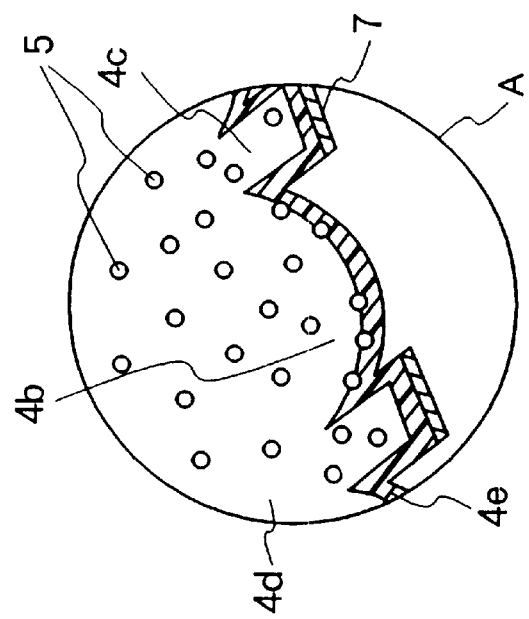
FIG. 15B is an enlarged horizontal sectional view of a section A in FIG. 15A.

FIGS. 15A and 15B schematically shows the basic structure of a rear projection type display apparatus having a permeable image display screen of a twelfth embodiment of the present invention. FIG. 15A is a schematic perspective view of the display apparatus, and FIG. 15B is an enlarged horizontal sectional view of a section A in FIG. 15A. Those structures in FIGS. 15A and 15B that are identical or corresponding to the structures in FIGS. 1A and 1B are assigned to the identical symbols.

In the permeable image display screen in the twelfth embodiment, the lenticular lens sheet 4 has a double resin structure, which consists of a rear layer 4d, on a side of the image light incidence surface containing diffusion particles 5, and a front layer 4e on a side of the image light emission surface containing no diffusion particles. The rear layer 4d and the front layer 4e may be either formed integrally with each other or formed separately. In this double resin structure, the front layer 4e fulfills the same function as the glossy permeable coating 6 in the first embodiment. For this reason, according to the permeable image display screen in the twelfth embodiment, a similar advantage as the case of the aforementioned first embodiment can be obtained. Except for the above points, the twelfth embodiment is the same as the first embodiment.

Thirteenth Embodiment

Figure 16B:
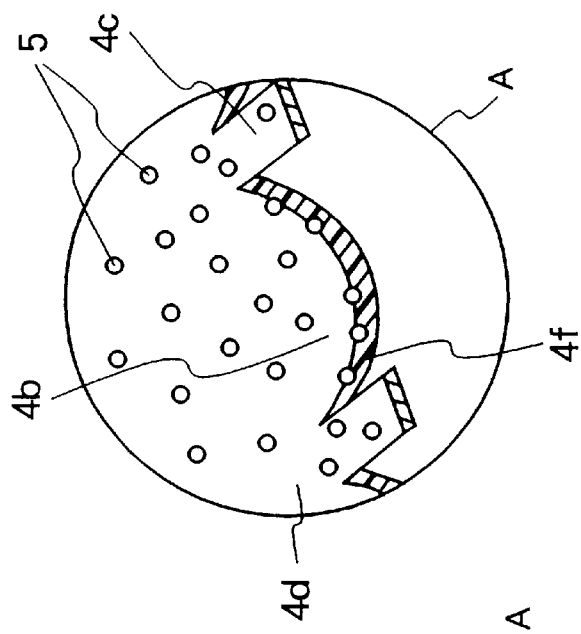
FIG. 16B is an enlarged horizontal sectional view of a section A in FIG. 16A.
Figure 16A:
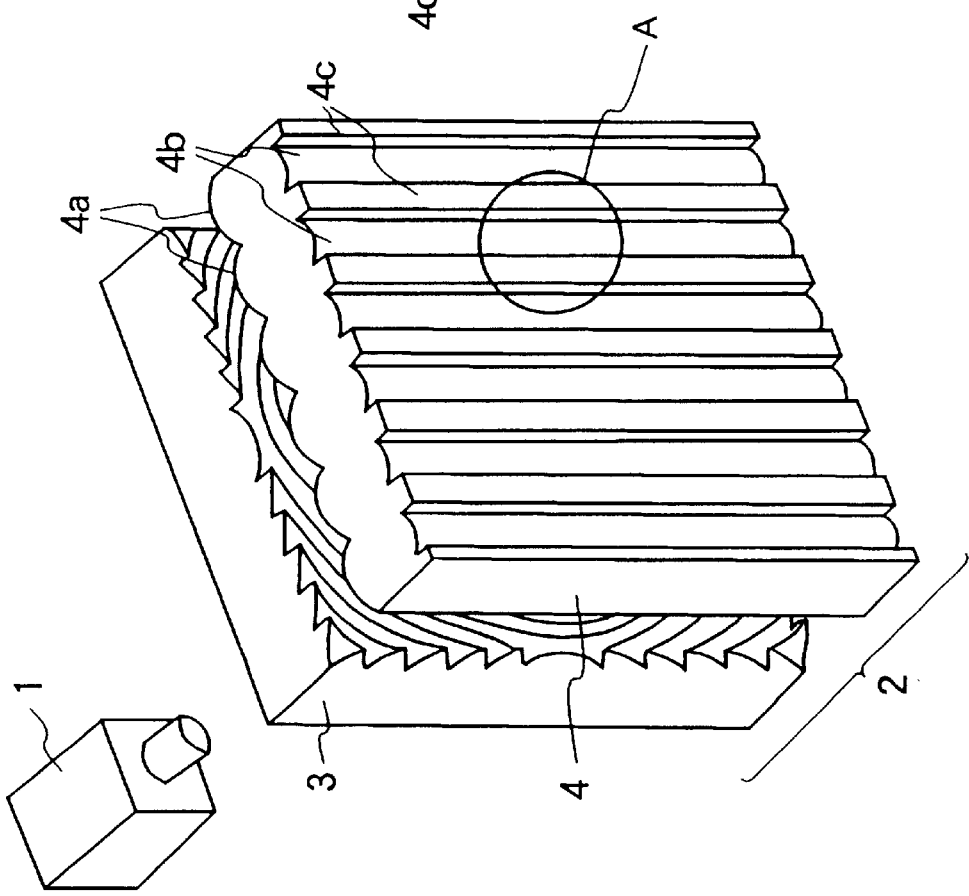
FIG. 16A is a schematic perspective view showing a rear projection type display apparatus having a permeable image display screen of a thirteenth embodiment of the present invention.

FIGS. 16A and 16B schematically shows the basic structure of a rear projection type display apparatus having a permeable image display screen of a thirteenth embodiment of the present invention. FIG. 16A is a schematic perspective view of the display apparatus, and FIG. 16B is an enlarged horizontal sectional view of a section A in FIG. 16A. Those structures in FIGS. 16A and 16B that are identical or corresponding to the structures in FIGS. 15A and 15B are assigned to the identical symbols.

The permeable image display screen in the thirteenth embodiment differs from the aforementioned twelfth embodiment only in that a front layer 4f is formed only on the surfaces of the second lens portions 4b on the side of the image light emission surface of the lenticular lens sheet 4 and is not formed on the surfaces of the non-focusing portions 4c. According to the permeable image display screen in the thirteenth embodiment, a similar advantage as the case of the aforementioned twelfth embodiment can be obtained. Except for the above points, the thirteenth embodiment is the same as the twelfth embodiment.

Fourteenth Embodiment

The permeable image display screen in the fourteenth embodiment differs from the case of the aforementioned twelfth embodiment only in that the front layer 4e contains a substance having a light absorbing characteristic and is colored to semitransparency. The front layer 4e containing the aforementioned substance having a light absorbing characteristic is also applicable to the permeable image display screen of the aforementioned thirteenth embodiment.

According to the permeable image display screen of the fourteenth embodiment, the extraneous light can be absorbed effectively compared to attenuation of the image light by the principles described in the third embodiment, and consequently, image quality degradation due to the extraneous light can be reduced. Except for the above points, the fourteenth embodiment is the same as the twelfth embodiment.

Fifteenth Embodiment

FIGS. 17A and 17B schematically show the basic structure of a rear projection type display apparatus having a permeable image display screen of a fifteenth embodiment of the present invention. FIG. 17A is a schematic perspective view of the display apparatus, and FIG. 17B is an enlarged horizontal sectional view of a section A in FIG. 17A. Those structures in FIGS. 17A and 17B that are identical or corresponding to the structures in FIGS. 1A and 1B are assigned to the identical symbols.

In the permeable image display screen in the fifteenth embodiment, surfaces 4g of the non-focusing portions 4c of the lenticular lens sheet 4 are polished so that the roughness degree of the surface is reduced and that the surface has gloss. For this reason, the scattered light of the extraneous light that is incident on the viewer's eyes is reduced, and regularly reflected light of the extraneous light is increased. Consequently, even when the permeable image display screen of the fifteenth embodiment is placed under light environments, an image which is less rough and which has a glossy feeling and depth can be obtained.

Figure 20:
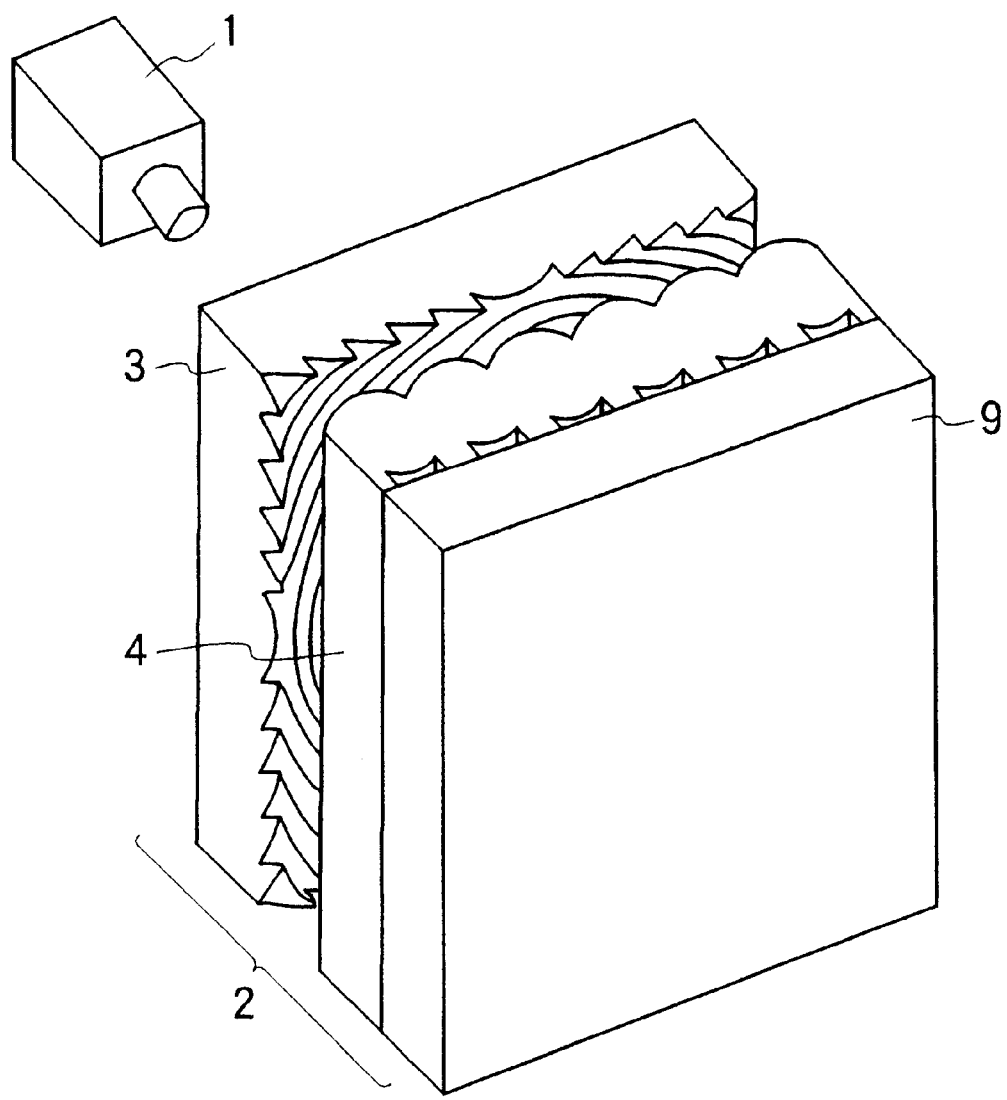
FIG. 20 is a schematic perspective view showing another conventional rear projection type display apparatus having a permeable image display screen.

In the case of the conventional example shown in FIG. 20, the extraneous light is regularly reflected by the entire surface of the acrylic plate, so there arises the problem that regularly reflected wide light that reaches the viewer's eyes overlaps the image light and considerably degrades image quality. However, since the non-focusing portions 4c in the fifteenth embodiment is formed into a vertically long strip shape, the width of the extraneous light that is regularly reflected at the mirror surface is narrow and divided. Therefore, as compared with the conventional example of FIG. 20, image quality degradation is reduced.

Sixteenth Embodiment

In any one of the first through eighth embodiments and the twelfth through fourteenth embodiments, the lenticular lens sheet of a sixteenth embodiment is not equipped with the light absorbing strips, and as with the fifteenth embodiment, the non-focusing portions 4c have a mirror-like surface. Therefore, according to the permeable image display screen of the sixteenth embodiment, the advantage of the fifteenth embodiment can be obtained in addition to the advantages of the first through the eighth embodiments and the twelfth through the fourteenth embodiments. That is, even when the permeable image display screen of the sixteenth embodiment is placed under light environments, an image which is less rough and which has a glossy feeling and depth can be obtained, and there is no image quality degradation due to the extraneous light reflected regularly at the surface of the permeable image display screen.

Seventeenth Embodiment

In any one of the first through the eighth embodiments and the twelfth through the fourteenth embodiments, each light absorbing strip 7 of a seventeenth embodiment has a mirror-like surface, as in the fifteenth embodiment. Therefore, according to the permeable image display screen of the seventeenth embodiment, the advantage of the fifteenth embodiment can be obtained in addition to the advantages of the first through the eighth embodiments and the twelfth through the fourteenth embodiments. Even when the permeable image display screen of the seventeenth embodiment is placed under light environments, an image which has depth, a glossy feeling, and no roughness can be obtained, and there is no image quality degradation due to extraneous light reflected regularly at the surface of the permeable image display screen.

Eighteenth Embodiment

Figure 18:
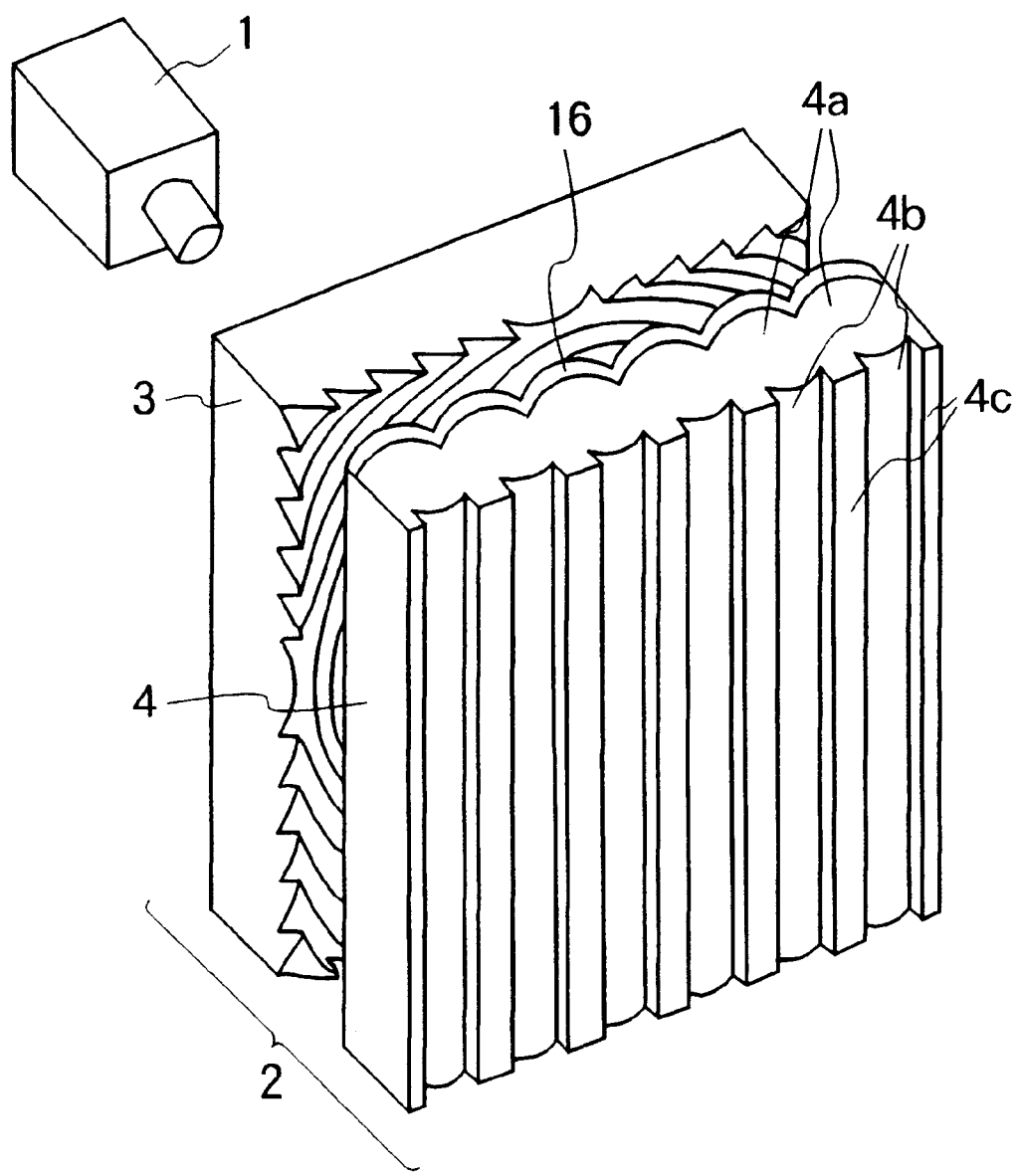
FIG. 18 is a schematic perspective view showing a rear projection type display apparatus having a permeable image display screen of an eighteenth embodiment of the present invention.
Figure 19B:
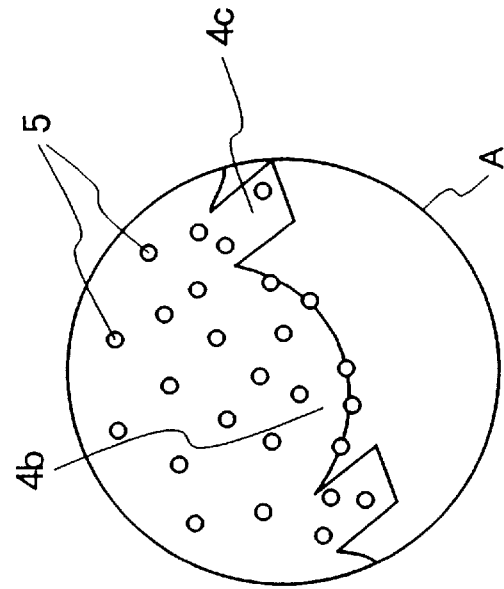
FIG. 19B is an enlarged horizontal sectional view of a section A in FIG. 19A.
Figure 19A:
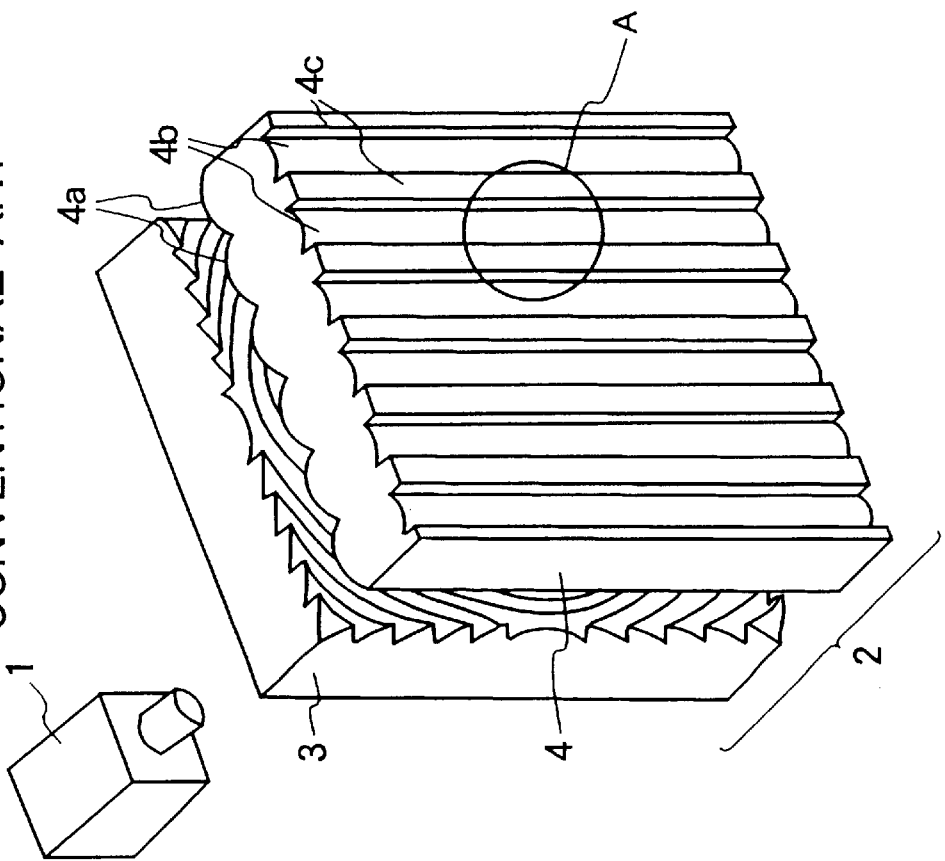
FIG. 19A is a schematic perspective view showing a conventional rear projection type display apparatus having a permeable image display screen.

In any one of the first through the eighth embodiments and the twelfth through the seventeenth embodiments, an antireflection film is provided on at least one surface of the sheet constituting the permeable image display screen. For example, as shown in FIG. 18, an antireflection film 16 is provided on the image light incidence surface of the lenticular lens sheet 4. Thus, by providing the antireflection film 16, the reflected light of the extraneous light, which has occurred on the interface between the lenticular lens sheet 4 and air, can be reduced, and image quality degradation due to the reflected light of the extraneous light can be suppressed.

Nineteenth Embodiment

The nineteenth embodiment differs from the aforementioned eighteenth embodiment only in that amorphous fluororesin is dissolved in a perfluoro solvent to obtain a desired concentration of solution and that the solution is applied as antireflection film on the screen surface by a spin method or a dipping method. For this reason, the permeable image display screen according to the nineteenth embodiment can be fabricated efficiently and easily. Except for the above points, the nineteenth embodiment is the same as the eighteenth embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A permeable image display screen comprising:

a lenticular lens sheet including a plurality of semi-cylindrical lens portions and a plurality of non-focusing portions, said semi-cylindrical lens portions being arranged with spaces on a side of an image light emission surface of said lenticular lens sheet and containing diffusion particles for diffusing an image light incident from an image light incidence surface of said lenticular lens sheet, and each of said plurality of non-focusing portions, through which the image light does not pass, being arranged on the side of said image light emission surface and between two adjacent said semi-cylindrical lens portions; and a glossy permeable layer provided on said image light emission surface of said lenticular lens sheet, wherein reflected light of extraneous light incident on said glossy permeable layer includes normally reflected light which travels in a single reflected direction and diffusely reflected light which travels in a plurality of directions, and said glossy permeable layer being constructed such that a relation of $I_t \geq 1.2 \times I_d$ is satisfied, where $I_t$ denotes luminous intensity of total reflected light obtained by summing up luminous intensity of the normally reflected light traveling in a fixed direction and luminous intensity of the diffusely reflected light traveling in a plurality of directions, and $I_d$ denotes luminous intensity of the diffusely reflected light traveling in the plurality of directions.

2. The permeable image display screen of claim 1, wherein:

reflected light of extraneous light incident on said glossy permeable layer includes normally reflected light which travels in a single reflected direction and diffusely reflected light which travels in a plurality of directions, and a relation of $I_t \geq 1.2 \times I_d$ is satisfied, where $I_t$ denotes luminous intensity of total reflected light obtained by summing up luminous intensity of the normally reflected light traveling in a fixed direction and luminous intensity of the diffusely reflected light traveling in a plurality of directions, and $I_d$ denotes luminous intensity of the diffusely reflected light traveling in a plurality of directions.

3. The permeable image display screen of claim 1, wherein said image light emission surface of said lenticular lens sheet has a glossy permeable layer applied as a coating.

4. The permeable image display screen of claim 1, wherein said image light emission surface of said lenticular lens sheet has a glossy permeable layer made from a film that is attached thereto.

5. The permeable image display screen of claim 4, wherein an adhesive agent is used to affix said film and to said image light emission surface of said lenticular lens sheet having light permeability.

6. The permeable image display screen of claim 5, wherein said adhesive agent has a color and is semitransparent as a result of containing a substance having a light absorption characteristic.

7. The permeable image display screen of claim 5, wherein said adhesive agent is selected from a group of materials including an ultraviolet ray sensitive material which is hardened by illumination from ultraviolet rays, a visible light sensitive material which is hardened by illumination from visible light, and an electromagnetic wave sensitive material which is hardened by illumination from electromagnetic waves, of non-ultraviolet and non-visible light wavelength electromagnetic waves.

8. The permeable image display screen of claim 5, wherein said adhesive agent is a thermoplastic material which has plasticity by heating.

9. The permeable image display screen of claim 4, wherein said film is a thermoplastic material which has plasticity by heating.

10. The permeable image display of claim 1, wherein said glossy permeable layer has a resin layer which is provided on said image light emission surface of said lenticular lens sheet, that is formed integrally with said lenticular lens sheet and contains no diffusion particles.

11. The permeable image display screen of claim 1, wherein said glossy permeable layer is provided only on surfaces of said semi-cylindrical lens portions.

12. The permeable image display screen of claim 1, wherein said glossy permeable layer is colored and semitransparent containing a substance having a light absorption characteristic.

13. The permeable image display screen of claim 1, wherein a light absorbing layer is provided on each of said non-focusing portions.

14. The permeable image display screen of claim 13, wherein a surface of said light absorbing layer is a mirror-like surface.

15. The permeable image display screen of claim 1, wherein a surface of each of said non-focusing portions is a mirror-like surface.

16. The permeable image display screen of claim 1, further comprising an antireflection film provided on at least one of said image light incidence surface and said image light emission surface of said lenticular lens sheet.

17. The permeable image display screen of claim 16, wherein said antireflection film is a film having characteristics which result from dissolving amorphous flouroresin in a perfluoro solvent to obtain a desired concentration of solution and applying the solution to said lenticular lens sheet by a spin method or a dripping method.

18. The permeable image display screen of claim 1, said diffusion particles having a diameter in a range of 10–20 $\mu$m and said glossy permeable layer having a thickness in a range of 20–30 $\mu$m.

* * * * *